United States Patent
Drake et al.

(10) Patent No.: US 10,587,749 B2
(45) Date of Patent: Mar. 10, 2020

(54) ENHANCEMENT CONTENT ASSET PRESENTATION ON USER DEVICES

(71) Applicant: T-Mobile USA, Inc., Bellevue, WA (US)

(72) Inventors: Aaron Drake, Sammamish, WA (US); Araceli Lesko, Bainbridge Island, WA (US); Jeffrey Giard, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/623,359

(22) Filed: Jun. 14, 2017

(65) Prior Publication Data

US 2018/0262614 A1    Sep. 13, 2018

Related U.S. Application Data

(60) Provisional application No. 62/469,936, filed on Mar. 10, 2017.

(51) Int. Cl.
*H04M 3/42* (2006.01)
*H04M 15/00* (2006.01)
(Continued)

(52) U.S. Cl.
CPC ....... *H04M 3/42042* (2013.01); *H04M 15/61* (2013.01); *H04W 4/90* (2018.02); *H04W 4/12* (2013.01); *H04W 88/02* (2013.01)

(58) Field of Classification Search
CPC ..... H04W 16/14; H04W 24/02; H04W 24/08; H04W 28/16; H04W 28/18; H04W 52/50;
(Continued)

(56) References Cited

U.S. PATENT DOCUMENTS 7,197,135 B1   3/2007   Silver et al.
7,840,211 B2   11/2010  Plumb et al.
(Continued)

FOREIGN PATENT DOCUMENTS

KR    100901423 B1    6/2009
KR    20130005776 A   1/2013
WO    2003061244 A1   7/2003

OTHER PUBLICATIONS

Office Action dated Nov. 7, 2017 issued in U.S. Appl. No. 15/623,352, 39 pages.
(Continued)

*Primary Examiner* — George Eng
*Assistant Examiner* — Umair Ahsan
(74) *Attorney, Agent, or Firm* — Han Santos, PLLC

(57) ABSTRACT

An enhancement content asset is received at a user device for presentation along with an incoming communication alert for a communication. The communication is initiated on a caller user device and routed to the user device via a wireless carrier network. A determination is made as to whether the enhancement content asset is to be suppressed from presentation on a user interface of the user device based on a configuration rule in a configuration data store of the user device. The enhancement content asset is not presented on the user interface in response to the configuration rule indicating that the enhancement content asset is to be suppressed from presentation on the user interface. Conversely, the enhancement content asset is presented along with the incoming communication alert on the user interface of the user device in response to the configuration rule indicating the enhancement content asset is permitted to be presented.

20 Claims, 12 Drawing Sheets

(51) Int. Cl.
*H04W 4/90* (2018.01)
*H04W 4/12* (2009.01)
*H04W 88/02* (2009.01)

(58) Field of Classification Search
CPC ............. H04W 72/12; H04W 72/1257; H04W 72/1215
See application file for complete search history.

(56) References Cited

U.S. PATENT DOCUMENTS

| | | | |
|---|---|---|---|
| 8,094,800 | B1 | 1/2012 | Smith et al. |
| 8,391,464 | B1 | 3/2013 | Sharp |
| 9,516,164 | B1 | 12/2016 | Keiser |
| 2002/0128033 | A1* | 9/2002 | Burgess ................ G06F 1/3209 455/528 |
| 2004/0030594 | A1 | 2/2004 | Berczik |
| 2004/0111476 | A1 | 6/2004 | Trossen et al. |
| 2005/0091409 | A1* | 4/2005 | Williams ............ H04L 41/0893 709/247 |
| 2005/0287997 | A1* | 12/2005 | Fournier ............... H04W 88/02 455/415 |
| 2006/0121887 | A1* | 6/2006 | Chilukoor ............. H04M 3/436 455/412.2 |
| 2007/0011256 | A1 | 1/2007 | Klein |
| 2007/0174467 | A1 | 7/2007 | Ballou et al. |
| 2007/0263808 | A1* | 11/2007 | Van Wyk ............. H04M 1/575 379/142.01 |
| 2008/0183541 | A1 | 7/2008 | Wenger et al. |
| 2008/0273677 | A1* | 11/2008 | Alfano .................... H04M 3/02 379/93.17 |
| 2009/0003568 | A1* | 1/2009 | Koretsky .............. H04M 1/658 379/142.01 |
| 2010/0279666 | A1* | 11/2010 | Small .................... H04M 1/576 455/414.1 |
| 2013/0035054 | A1* | 2/2013 | Ashton ................. H04M 1/576 455/404.1 |
| 2013/0218731 | A1 | 8/2013 | Elson et al. |
| 2014/0108668 | A1 | 4/2014 | Zhang et al. |
| 2015/0163353 | A1 | 6/2015 | Nezarati et al. |
| 2016/0381214 | A1* | 12/2016 | Messenger ........... H04W 76/10 455/415 |
| 2017/0150321 | A1 | 5/2017 | Ciecko |
| 2017/0223018 | A1 | 8/2017 | Khalil |

OTHER PUBLICATIONS

Final Office Action for U.S. Appl. No. 15/623,352 dated May 24, 2018, 51 pages.
International Search Report and Written Opinion for PCT Application No. PCT/US2018/019214 dated Jun. 4, 2018, 12 pages.
Non-Final Office Action for U.S. Appl. No. 15/623,352 dated Aug. 24, 2018, 60 pages.
U.S. Appl. No. 15/623,352, Final Office Action dated Apr. 4, 2019, 59 pages.
U.S. Appl. No. 15/623,352, Non-Final Office Action dated Jul. 8, 2019, 61 pages.
U.S. Appl. No. 15/623,352, Final Office Action dated Jan. 2, 2020, 58 pages.

* cited by examiner

ENHANCEMENT CONTENT ASSET PRESENTATION ON USER DEVICES

CROSS REFERENCE TO RELATED PATENT APPLICATION

This application claims priority to U.S. Provisional Patent Application No. 62/469,936, filed on Mar. 10, 2017, entitled "Incoming Call Enhancement," which is hereby incorporated by reference in its entirety.

BACKGROUND

Users of telecommunication devices receive multiple voice calls throughout the day. Caller ID is a feature that enables users to know who a caller is before the user picks up the phone. However, the information provided by a caller ID feature is generally limited. For example, caller ID may show a telephone number or a pre-registered name associated with the telephone number. In some instances, such information may be sufficient for a user to identify the caller and decided whether to take or reject an incoming call. However, in other instances, such information may provide insufficient context for a user to decide whether to take or reject the call.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for enabling a user device of a recipient to present enhancement content assets with incoming communication alerts. A user device may be any device that uses a wireless carrier network to send and receive communication data. For example, the user device may be a smart phone, a tablet computer, a portable computer, or any other device that is capable of performing telecommunication functions. An incoming communication may in the form of a voice call, a multimedia call, an email message, an text message, a chat message, and/or so forth. Accordingly, an incoming communication alert is a paging notification that is presented on the user device of the recipient to indicate to the recipient that an incoming communication is available for the recipient. The incoming communication alert may be presented by the user device in many different forms, such as audio ringing of the device, vibration of the device, and/or display of a visual indicator on a user interface screen of the user device. For example, an incoming communication alert for a voice call may be presented in the form of audio ringing of the user device along with a visual notification message on a display of the user device. In another example, an incoming communication alert for an email message may be presented in the form of an audio chime and a visual presentation of the sender name and subject line on a display of the user device.

The presentation of an enhancement content asset along with an incoming communication alert may provide additional information regarding the nature of the incoming communication. The enhancement content asset may be in the form of a text message, a social media feed, a rich media file, audio content, still image content, video content, multimedia content, web page scripts, uniform resource locators (URLs), other types of links to content and/or applications, and/or so forth that provide further information or context for an incoming communication.

Accordingly, the enhancement content asset that is presented along with an incoming communication alert may serve to provide additional context for the recipient to determine whether to accept or reject the incoming communication. In other instances, the enhancement content asset may provide background information that assists the recipient in having a more productive or efficient communication exchange with the caller. As used herein, the "caller" may be an initiator of any type of communication, including voice or multimedia calls, as well as data communication exchanges (e.g., emails, texts, chat messages, etc.). The techniques described herein may be implemented in a number of ways. Example implementations are provided below with reference to the following figures.

Example Network Architecture

Figure 1:
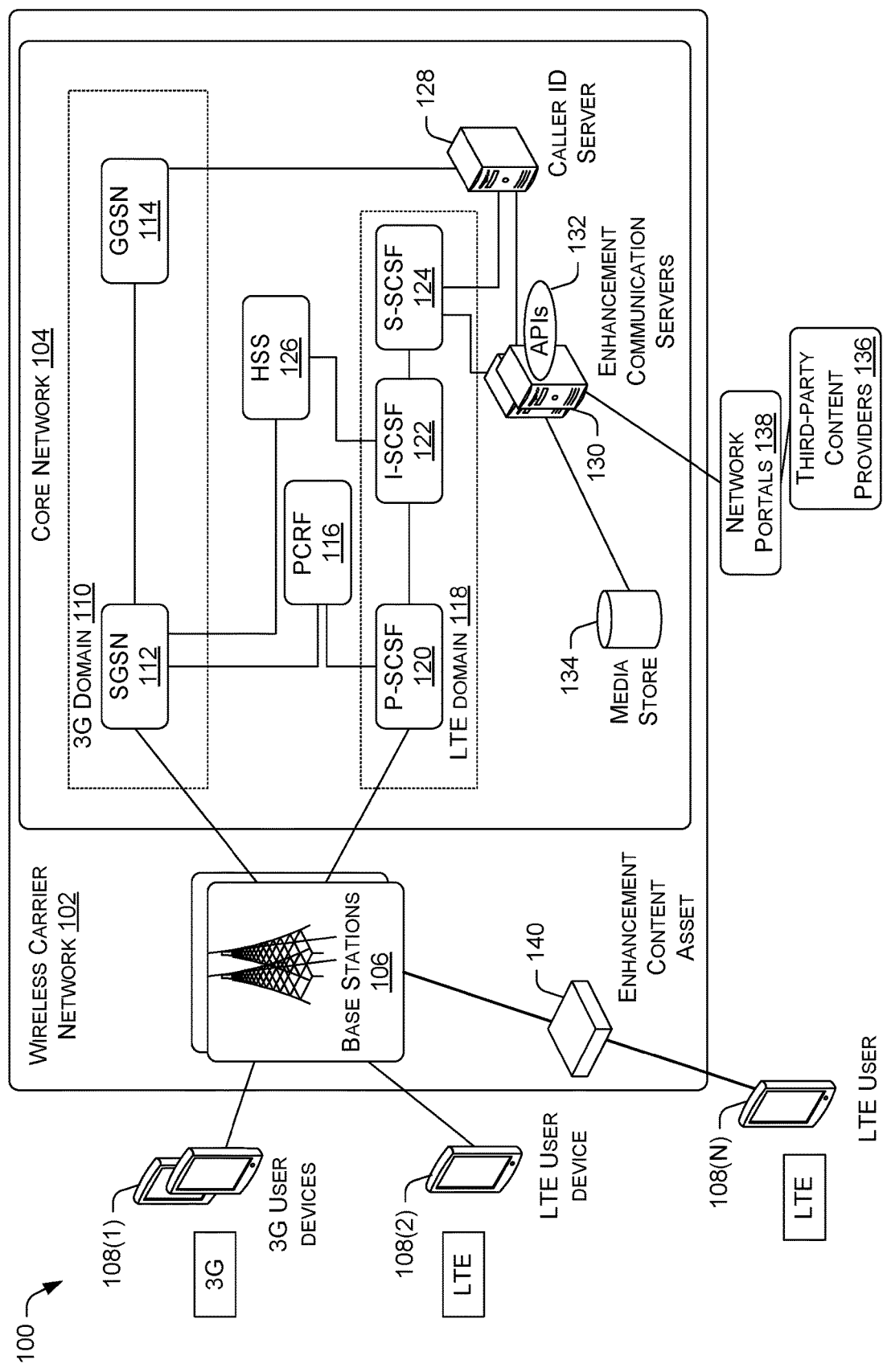
FIG. 1 illustrates an example wireless carrier network architecture for implementing an incoming communication enhancement function that provides enhancement content assets along with incoming communication alerts.

FIG. 1 illustrates an example wireless carrier network architecture 100 for implementing an incoming communication enhancement function that provides enhancement content assets along with incoming communication alerts. The wireless carrier network 102 may provide telecommunication and data communication in accordance with one or more technical standards, such as Enhanced Data Rates for GSM Evolution (EDGE), Wideband Code Division Multiple Access (W-CDMA), High Speed Packed Access (HSPA), Long Term Evolution (LTE), CDMA-2000 (Code Division Multiple Access 2000), and/or so forth.

The wireless carrier network 102 may include a radio access network and a core network 104. The radio access network may include multiple base stations 106. The multiple base stations 106 are responsible for handling voice and data traffic between multiple user devices, such as the user device, and the core network. Accordingly, each of the base stations 106 may provide a corresponding network cell that delivers telecommunication and data communication coverage. The core network 104 may use the network cells to provide communication services to the multiple user devices 108(1)-108(N). For example, the core network 104 may connect the multiple user devices 108(1)-108(N) to other telecommunication and data communication networks, such as the Internet and the public switched telephone network (PSTN). The base stations 106 are responsible for handling voice and data traffic between user devices and the core network. In some embodiments, the base stations 106 may be in the form of eNodeB nodes. Each eNodeB node may include a base transceiver system (BTS) that communicates via an antenna system over an air-link with one or more user devices that are within range. The antenna system of an eNodeB node may include multiple antennas that are mounted on a radio tower to provide a coverage area that is referred to as a "cell." The BTS may send RF signals to user devices and receive RF signals from user devices.

In various embodiments, the core network 104 may include one or more servers that implement network components. The components in the 3G domain 110 of the core network may include a serving GPRS support node (SGSN) 112 that routes voice calls to and from the PSTN, and a Gateway GPRS Support Node (GGSN) 114 that handles the routing of data communication between external packet switched networks and the core network. The core network 104 may further include a policy engine, a billing function, and a gateway. The policy engine may be a software component that determines policy and enforces policy rules, and serves to establish calls and allocate bandwidth to call bearers. In various embodiments, the policy engine may be a Policy and Charging Rules Function (PCRF) 116 or another equivalent core network component of the wireless carrier network. The billing function may enable the wireless carrier network to monitor the services, such as data, voice, text, etc., that are used by each subscriber, and charge the subscribers and/o other parties in real-time based on service usage. In various embodiments, the billing function may be an Online Charging System (OCS) or another equivalent core network component of the wireless carrier network.

The LTE domain 118 of the core network 104 may include an IP Multimedia Subsystem (IMS) core. The IMS core may be accessed via one or more servers and related components that are tasked with providing connectivity between wireless carrier network and the user devices by acting as a point of entry and exit for data traffic. In turn, the IMS core may provide the user devices with data access to external packet data networks, such as the networks of other wireless carrier networks. Accordingly, the gateway may perform functions such as policy enforcement, packet filtering, packet screening, and/or charging support. In various embodiments, the gateway may be an Evolved Packet Data Network Gateway (ePDG) or another equivalent core network component of the wireless carrier network.

The IMS core may include a Proxy Call Session Control Function (P-CSCF) 120 or an equivalent function. The P-CSCF 120 may route incoming SIP messages to an IMS registrar server. The P-CSCF 120 may also safeguard the security of the IMS core by handling Internet Protocol Security (IPSec) for communications that are exchanged by with user devices. In some alternative instances, instead of SIP sessions, the P-CSCF 120 may handle Remote Authentication Dial-In User Service (RADIUS) sessions. The P-CSCF 120 may interact with an Interrogating CSCF (I-CSCF) 122, and a Serving CSCF (S-CSCF) 124. The S-CSCF 124 may communicate with a telephony application server (TAS) that resides in the core network. The TAS may route voice and/or data communications within the wireless carrier network and with other networks, including public switch telephone networks (PSTNs). For example, the TAS may be a SIP application server that handles IP telephony for voice over LTE (VoLTE) services. Collectively, the CSCFs may handle Session Initiation Protocol (SIP) sessions, which are communication sessions for packet-based voice and video calls, instant messaging over IP networks, and/or so forth. The IMS core may also route packet data traffic to backend servers. The backend servers may include servers that are operated by the wireless carrier network to distribute content and provide services. Accordingly, the 3G domain 110 and the LTE domain 118 may use network subscriber information that is stored in the Home Subscriber Server (HSS) 126, or alternatively, a Home Location Register (HLR), to perform their functions.

In various embodiments, the backend servers may include a caller ID server 128 that is responsible for obtaining and providing a telephone number of a caller's user device that is delivered by the GGSN 114 to a call recipient's user device, such that the telephone number is displayed on a call alert or caller ID screen of the user device (e.g., 3G user device 108(1)). In some instances, the caller ID server 128 may distribute an enhanced content asset in the form of additional text data to the user device of the recipient in conjunction with the telephone number of the caller's user device. For example, the text data may be a description of the caller's business and/or the subject matter of the caller's call to the recipient.

The backend servers may further include one or more enhancement communication servers (ECS) 130. The ECS 130 is responsible for determining the enhancement content asset that correlates with each incoming communication for a subscriber of the wireless carrier network, and providing the enhancement content for presentation on the user device of the subscriber along with an incoming communication alert. To perform its functions, the ECS 130 may use databases that store configuration files of rules, settings, options, and/or so forth, in one or more file systems.

The ECS 130 may interface with telecommunication software on the user devices, such as the LTE user devices 108(2)-108(N). Accordingly, the telecommunication software on a user device may present enhancement content assets along with an incoming communication alert. In some embodiments, the telecommunication software may be an application that resides in an application layer of the user device. For example, such an application may be a video calling application, a Wi-Fi calling application, a Voice over LTE (VoLTE) application, a Short Message Service (SMS) text messaging application, a Rich Communication Services (RCS) text messaging application, an email application, a chat application, and/or so forth. The video calling application may provide packet data-based video telephony that enables voice and video telecommunication over the wireless carrier network. The Wi-Fi calling application may provide Voice over wireless LAN (VoWLAN) or Video over wireless LAN (ViWLAN) calling by using an available wireless broadband network implemented according to IEEE 802.11 standards to carry voice and/or video communication.

The VoLTE application or video calling application may use the IMS core of the wireless carrier network to provide Internet Protocol (IP) data packet-based voice/video communication services to the user device. The RCS application may provide advanced messaging services, such as Multimedia Messaging Service (MMS), and the sharing of device locations. Additionally, the RCS application may provide other features such as attachment of large multimedia files, notification that the other party is typing a message, message delivery notification, and/or so forth. In other embodiments, the telecommunication software may include over-the-top (OTT) applications that perform similar functions. In still other embodiments, the telecommunication software may be built into the operating system (e.g., Android OS, iOS, etc.) of the user device.

The ECS 130 may use one or more application program interface (APIs) 132 to interface with a media store 134. The ECS 130 may use calls to the APIs 132 to store, retrieve, update, and delete enhancement content assets from the media store 134. For example, a first API may be called with a reference to an enhancement content asset to upload the enhancement content to the media store, and a second API may be called with the reference to retrieve the enhancement content asset for distribution to a recipient user device. In various embodiments, a reference may be a directory location of the media store at which the enhancement content asset is stored. The media store 134 may store enhancement content assets that are created by individual callers, created by the operator of the wireless carrier network, or created by third-party content providers 136. The third-party content providers may include companies, government organizations, celebrities, and/or so forth. For example, a third-party content provider may be a VoIP service provider, an email service provider, a news service provider, a streaming media service provider, a call center, and/or so forth. The third-party content providers may maintain network portals 138 that are accessible to the ECS through APIs. For example, the network portals may include websites, social media sites, microblogging sites, information sites, media sharing sites, etc. The ECS 130 may access the network portals 138 via content references, e.g., network addresses of application servers, web links to particular resource locations, web links to particular enhancement content assets that are provided by the third-party content providers 136 to retrieve the enhancement content assets.

The enhancement content assets may be generated by callers who initiate incoming communications to a recipient device of a recipient, such as the recipient user device 108(N). Alternatively, the enhancement content assets may be generated by a designee of the caller that initiates an incoming communication to the recipient device of the recipient. For example, in addition to an incoming voice call alert that displays a telephone number of the caller that initiated the call, an enhancement content asset 140 may be presented along with the alert on the recipient device 108(N). The enhancement content asset 140 may be in the form of a text message, a social media feed, a rich media file, audio content, still image content, video content, multimedia content, web page scripts, uniform resource locators (URLs), other types of links to content and/or applications, and/or so forth that provide further information or context for the incoming communication. In some instances, the text message may use Unicode or Multibyte Character Set (MBCS), rather than single byte coding such as UTF-8 encoding to support multiple languages of different countries. In other instances, a caller may wish to send a text message and/or a multimedia content such as video, still images, and/or audio that provides additional context for the identity of the caller and/or the reason that the caller is calling the recipient.

In other instances, the enhancement content asset may be supplied by a third-party, such as a company or a celebrity. For example, a caller who is calling the recipient to wish the recipient a happy birthday may send a birthday greeting message recorded by a celebrity for the recipient. In additional instances, the enhancement content asset may be supplied by a government regulatory body or a governmental entity. For example, a caller may be a school district automated caller system that is calling regarding a school closure announcement. In such example, the enhancement content asset may be a video footage that shows road conditions around schools in the district. In another example, the caller may be a municipal parking enforcement agency calling regarding a parking violation, and the enhancement content asset may be an image of a parking violation notice and an image of the user's vehicle in a no-parking zone. In an additional example, the caller may be an interactive voice response (IVR) application and/or service configured to provide information to a recipient in response to an information request initiated by the recipient. In still other examples, the enhancement content asset may be a multimedia content asset that is purchased by a caller for presentation on the user device of the recipient when the caller calls the recipient on the recipient user device. For example, such media content asset may be a themed media pack of humorous images or quotations, in which a different humorous image or quotation is displayed on the user device when the caller calls the recipient. In this way, a caller may initiate a communication to a recipient at the user device 108(2), such that an enhancement content asset 140 is delivered to the recipient user device 108(N) of the recipient along with an incoming communication alert.

Example Server Components

Figure 2:
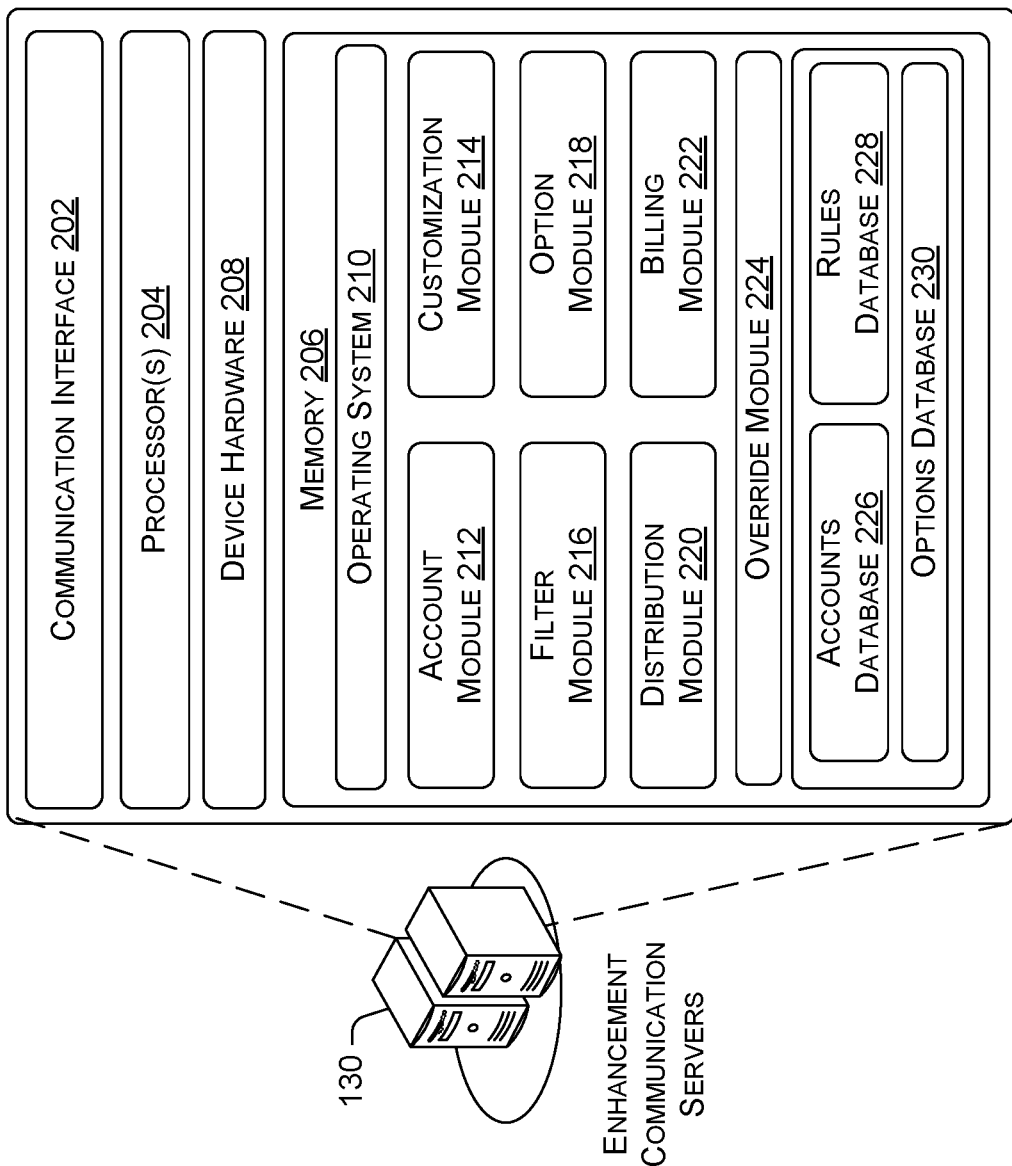
FIG. 2 is a block diagram showing various components of an enhancement communication server that provides enhancement content assets along with incoming communication alerts.

FIG. 2 is a block diagram showing various components of the enhancement communication servers 130 that provides enhancement content assets along with incoming communication alerts. In some embodiments, the enhancement communication servers 130 may be replaced with one or more virtual computing devices in the form of virtual machines or software containers that are hosted in a cloud and connected to the core network 104 of the wireless carrier network 102. The virtual computing devices may be provided by third-party cloud computing service providers, such as Amazon Web Services (AWS) or Microsoft Azure. Alternatively, the virtual computing devices may be operated by the wireless carrier network 102. The virtual computing devices may be connected to the core network 104 via a virtual private network (VPN) or other types of secure network connections. The enhancement communication servers 130 may be equipped with a communication interface 202, one or more processors 204, memory 206, and device hardware 208. The communication interface 202 may include wireless and/or wired communication components that enable the computing devices to transmit data to and receive data from other networked devices via a communication network. The device hardware 208 may include additional hardware that performs user interface, data display, data communication, data storage, and/or other server functions.

The memory 206 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission or non-transitory medium that can be used to store information for access by a computing device. In contrast, communication media may embody computer-readable instructions, data structures, program modules, or other data in a modulated data signal, such as a carrier wave, or other transmission mechanism.

The processors 204 and the memory 206 of the enhancement communication servers 130 may implement an operating system 210. The operating system 210 may include components that enable the enhancement communication servers 130 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The processors 204 and the memory 206 of the ECS 130 may further implement an account module 212, a customization module 214, a filter module 216, an option module 218, a distribution module 220, a billing module 222, and an override module 224. The ECS 130 may further employ various databases. The databases may include relational databases, object databases, object-relational databases, and/or key-value databases.

The account module 212 may provide user interfaces for entities to establish accounts with the wireless carrier network 102. The accounts may enable these entities to upload and control the distribution of enhancement content assets to recipient user devices. The entities may include callers who desire to create their own enhancement content assets, third-party content providers who are providing enhancement content assets for others to distribute, as well as third-party content providers who are distributing their own enhancement content. Each entity may establish a corresponding customer account by providing registration information. The registration information may include a customer name, a customer address, customer contact information, a login name, a password, and/or so forth. Each of the account may also include account access information for one or more financial accounts that a corresponding entity provided for paying transactions and receiving refunds. The account module 212 may make use of authentication functions that control access to the accounts. The account information of the entities may be stored in an accounts database 226. In some instances, the accounts database 226 may be a part of a network subscriber database, e.g., the HSS 126 or an equivalent HLR.

In various embodiments, an account may enable an entity to access network portals (e.g., network portal, intranet portals, etc.) following authentication using a corresponding user account and password. For example, a network portal may enable the entity to upload enhancement content or a reference to the enhancement content. The network portal may further allow the entity to select recipient user devices via device identifiers (e.g., MSISDNs, IMEIs, etc.) to receive the enhancement content asset. A reference may enable a recipient user device to access an enhancement content asset that is stored on the media store 134 of the wireless carrier network 102, or stored on a server of a third-party content provider but not uploaded to the media store 134. The network portal may further enable the entities to select the billing and/or payment terms for the presentation of the enhancement content assets.

The customization module 214 may enable a caller to control the specific enhancement content asset that is delivered to a recipient user device along with a communication alert. The customization module 214 may be accessed by a caller via a network portal. The network portal may enable a caller to create an account, authenticate to the account via a caller identifier, and then upload or select the enhancement content asset that is to be delivered to particular recipient user devices. For example, the network portal may enable the caller to upload an audio recording, a still image, or a multimedia clip for distribution to a particular recipient user device of a recipient. In another example, the network portal may enable the caller to use a pull down menu to select an enhancement content asset from a list of pre-stored or pre-screened enhancement content assets for distribution to the particular recipient user device of the recipient. The recipient user devices may be selected via corresponding recipient identifiers.

Both the caller identifier and the recipient identifier may take the form of a Mobile Station International Subscriber Directory Number (MSISDN), an International Mobile Equipment Identity (IMEI), an International Mobile Subscriber Identity (IMSI), a Mobile Equipment Identifier (MEID) in the form of an Electronic Serial Number (ESN), and/or a subscriber access identifier that is assigned by the wireless carrier network 102 to identifier the user as a subscriber of the wireless carrier network 102. The subscriber access identifier is used by the wireless carrier network 102 is to authenticate the user via a built-in authentication mechanism for the purpose of providing the user with access to services and/or applications that are hosted by the wireless carrier network 102, as well as hosted by third-party service and/or application providers. Accordingly, the ECS 130 may maintain a rules database 228 that contains rules for correlating caller identifiers with the specific enhancement content that the callers desire to present to recipients of calls.

The filter module 216 may analyze and screen out potentially offensive portions of enhancement content assets that are stored in the media store 134. In some instances, the filter module 216 may delete entire files of enhancement content asset that are determined to be offensive. In other instances, the filter module 216 may filter out portions offensive audio snippets, video images, and/or text from the enhancement content. For example, offensive images may be filtered out via pixilation, offensive sounds or language may be bleeped out or replaced with muting or other audio snippets, and offensive portions of text may be removed or replaced with non-offensive characters or symbols. The filter module 216 may use image, audio, and/or text recognition algorithms, or machine learning algorithms, to recognize offensive content for filtering. In various embodiments, the ECS 130 may use the filter module 216 to process an enhancement content asset at the time the enhancement content asset is uploaded into the media store. Alternatively, processing of the enhancement content asset by the filter module 216 may be performed when the enhancement content asset is selected for distribution.

Network subscribers of the wireless carrier network 102 may opt-in or opt-out of receiving enhancement content assets along with incoming communications alerts. Accordingly, the option module 218 may store such configuration settings in the options database 230. A network subscriber may customize such configuration settings via a customization interface. In various embodiments, the customization interface may be a network portal that is provided by the wireless carrier network 102 for access by a network subscriber via the Internet, or a user configuration interface displayed on a user device of the network subscriber. The customization interface may include checkboxes, radio buttons, toggle switches, and/or so forth, that enables the activation or inactivation of enhancement content distribution features. In some embodiments, the customization interface may enable the network subscriber to globally opt-in or opt-out of receiving enhancement content assets along with incoming communication alerts.

In other embodiments, the user configuration interface may enable the user to selectively opt-in or opt-out receiving enhancement content assets from specific caller based on a corresponding caller identifier, or a specific group of callers based on corresponding caller identifiers of the callers or a common group identifier (e.g., team, class, friends, relatives, co-workers, etc.) of the specific group. For example, the network subscriber may use the user configuration interface to activate receiving enhancement content assets from "caller A", while deactivate receiving enhancement content assets from "caller B". In another example, the network subscriber may use the user configuration interface to activate receiving enhancement content assets from callers in a "friend group", while deactivate receiving enhancement content assets from callers in a "co-worker" group. In additional embodiments, the user configuration interface may enable the network subscriber to selectively opt-in or opt-out receiving enhancement content assets by type, such as asset format or asset category. For example, the network subscriber may use the user configuration interface to activate receiving enhancement content assets in the form of still images, while deactivating receiving enhancement content assets in the form of videos. In another example, the network subscriber may use the user configuration interface to activate receiving enhancement content assets that are generated by a caller, while deactivating receiving enhancement content assets that are provided by third-party content providers.

In various embodiments, the user configuration interface may be accessed via a settings icon that is displayed on a call alert screen provided by a telecommunication application, or accessed via a common application settings page provided by an operating system of the user device. The opt-in/opt-out configuration settings as inputted by the network subscriber via the network portal may be stored in the options database 230. Accordingly, the distribution module 220 may refrain from delivering enhancement content assets to a network subscriber when the options database 230 indicates that the subscriber has opted out of receiving the enhancement content. On the other hand, the opt-in/output-out configuration settings as inputted by the network subscriber via the user configuration interface displayed on a user device may be stored either in the options database 230 or a local configuration data store of the user device. In instances in which the settings are stored in the local configuration data store, the telecommunication software on the user device may be responsible for suppressing the enhancement content assets from being presented on the user device, despite the distribution of the enhancement content assets by the ECS 130 to the user device.

The distribution module 220 may select enhancement content assets for distribution along with incoming communication alerts to recipient user devices. Thus, the distribution module 220 may receive a caller identifier of caller that initiated a communication to one or more recipient user device of a recipient from the IMS core of the core network 104, as well as the recipient device identifier of the terminating recipient user device for the communication. Subsequently, the distribution module 220 may consult the rules database 228 to determine the enhancement content asset that is to be presented with an incoming communication alert to the terminating recipient user device. In some instances, the rules database 228 may store rules that enable the caller to present different enhancement content to different call recipients. In other words, the rules database 228 may specify that a first recipient identifier is associated a first type of enhancement content, and a second recipient identifier is associated with a second type of enhancement content. Each recipient identifier may be of a different type as described with respect to the caller identifier (e.g., MSISDN, IMEI, MEID, subscriber access identifier, etc.). In this way, the ECS may use the rules database 228 to deliver customized enhancement content to individual call recipients. In alternative embodiments, the functionalities associated with the rules database 228, the customization module 214, and the distribution module 220 may be provided by the caller ID server 128 or the PCRF 116.

In various embodiments, the distribution module 220 may refrain from delivering enhancement content assets to a network subscriber when the network subscriber has opted out of receiving the enhancement content assets. In such embodiments, the distribution module 220 may verify the opt-in/opt-out configuration settings for the network subscriber as stored in the options database 230 to determine whether to distribute the network assets. The distribution module 220 may distribute an enhancement content asset to a recipient user device via the transmission of a reference for an enhancement content asset to the recipient user device. In some embodiments, the reference may be generated by the distribution module 220. The reference that is transmitted to a recipient user device by the distribution module 220 may be of several types. The first type of reference is a link or pointer to a specific enhancement content asset that is stored on the media store 134 or at a media server of a third-party content provider. The reference enables the retrieval of the specific enhancement content asset from media store 134 or the media server by the recipient user device.

The second type of reference is a pointer to a specific directory location on the media store or the media server of the third-party content provider. Accordingly, this type of reference may be used by the recipient user device to retrieve whatever enhancement content that is stored at the specific directory location. For example, a musician may place a latest released song at the specific directory location, or a celebrity may place a latest blog posting at the specific directory location. Accordingly, the reference can be used to access the most up-to-date enhancement content without the use of unique references.

The third type of reference is a server pointer to a particular server of wireless carrier network or third-party content provider. In turn, the server is responsible for determining and generating the appropriate enhancement content to provide to a recipient user device that submitted the reference. For example, the server may be responsible for providing weather forecast updates. Accordingly, the server may use geolocation information that is submitted by the recipient user device along with the reference to retrieve the latest weather information for the geolocation of the recipient user device. For example, the server may be responsible for providing traffic condition updates. Accordingly, the server may use geolocation information that is submitted by the recipient user device along with the reference to retrieve the latest traffic condition for the geolocation of the recipient user device. In various embodiments, the server may be operated by the wireless carrier network 102 or a third-party content provider 136.

The billing module 222 may trigger the PCRF 116 or another equivalent billing function of the wireless carrier network to bill each caller for the distribution of enhancement content. In various embodiments, the billing module 222 may send a billing event notification to the PCRF 116 or the equivalent function following the distribution of an enhancement content asset. The billing event notification may include information such as the caller identifier of the caller, recipient identifier of the recipient, identification information of the enhancement content asset, identification information of the party that generated the enhancement content asset, and/or so forth. In turn, the PCRF 116 or the equivalent function of the wireless carrier network 102 may use the billing event notification to perform billing.

The PCRF 116 may performed the billing on a per impression delivery basis, such that the caller is billed a set fee for each presentation of enhancement content on a recipient device. Other billing arrangements may include billing a set fee for each multiple (e.g., five, ten, etc.) presentations of enhancement content. Volume based escalated billing or discounted billing may also be performed, such that the fee per each presentation of enhancement content asset may increase or decrease based on the volume of enhancement content that is presented in a predetermined time period. Other billing arrangement for a caller may include a recurring flat fee (e.g., weekly fee, monthly fee, etc.), a one-time fee, and/or so forth.

In some instances, the billing module 222 may use the PCRF 116 to credit back users of recipient user devices that received enhancement content assets. In such instances, the users may have metered plans that charge the users per talk time or data usage. Accordingly, the PCRF 116 may track the amount of talk time or data is used for the distribution of the enhancement content asset for presentation on a recipient user device of a user, and then credit the allocated talk time or data plan of the user with the amount used. The credit back may include roaming charges that the user may accrue due to using a third-party wireless carrier network. In this way, a network subscriber is not charged for receiving enhancement content asset.

The billing module 222 may further include a content provider billing function that is configured to charge third-party content providers for providing enhancement content assets that are to be delivered to recipient user devices along with incoming communication alerts. The billing function may charge a third-party content provider a set fee for each presentation of enhancement content asset on a recipient device. Other billing arrangements may include billing a set fee for each multiple (e.g., five, ten, etc.) presentations of enhancement content asset. Volume-based escalated billing or discounted billing may also be performed, such that the fee per each presentation of an enhancement content asset may increase or decrease based on the volume of each enhancement content asset that is presented in a predetermined time period. Other billing arrangement for a third-party content provider may include a recurring flat fee (e.g., weekly fee, monthly fee, etc.), a one-time fee, and/or so forth.

In some instances, the billing module 222 may charge additional fees for storing and serving the enhancement content of a third-party content provider from a media store of the wireless carrier network, rather than "passing through" enhancement content that is served directly from a server of the content service provider. The additional fees may compensate the wireless carrier network for storing and/or filtering the enhancement content assets.

The override module 224 may send commands that activate or deactivate certain features of the telecommunication software on the recipient user devices so that enhancement content assets may be presented. The commands may include a command to override the enhancement content opt-out setting. For example, a government agency may desire to send an enhancement content asset to accompany an automated critical disaster or emergency warning call. Another command may override the ringer/speaker muting, screen blanking, or do not disturb setting of the telecommunication software so that the enhancement content asset may be presented. For example, a spouse may desire to place a voice call and/or send an accompanying enhancement content asset to another spouse in an emergency situation, which involves performing one or more overrides to ensure the receipt of the call and/or the enhancement content asset. In some instances, users may consent to such emergency overrides via a configuration setting on the user device or at an online portal provided by the ECS 130.

In various embodiments, an authentication server that is accessible via the P-CSCF 120 of the core network 104 may provide a built-in authentication mechanism to the ECS 130 for authenticating a subscriber access identifier of a caller. Thus, a caller is authorized to initiate an incoming communication to a user when the identity of the caller is positively confirmed. For the purpose of increasing security, the built-in authentication mechanism may use a two-factor authentication. For example, the caller identifier of a caller who initiated an incoming voice call is deemed to be authenticated when both the subscriber access identifier of the caller and a IMEI of the caller's user device are both confirmed to exist and associated together in a network subscriber database (e.g., HSS 126). The use of an authenticated subscriber access identifier, along with the use of IPSec for encrypting and transmitting VoLTE data, may reduce or eliminate the possibility of caller identity spoofing for triggering unauthorized distribution of enhancement content assets with incoming communication alerts. Accordingly, these security mechanisms may prevent fraud and ensure that no one other than authorized callers can trigger the distribution of enhancement content with incoming communication alerts.

Example User Device Components

Figure 3:
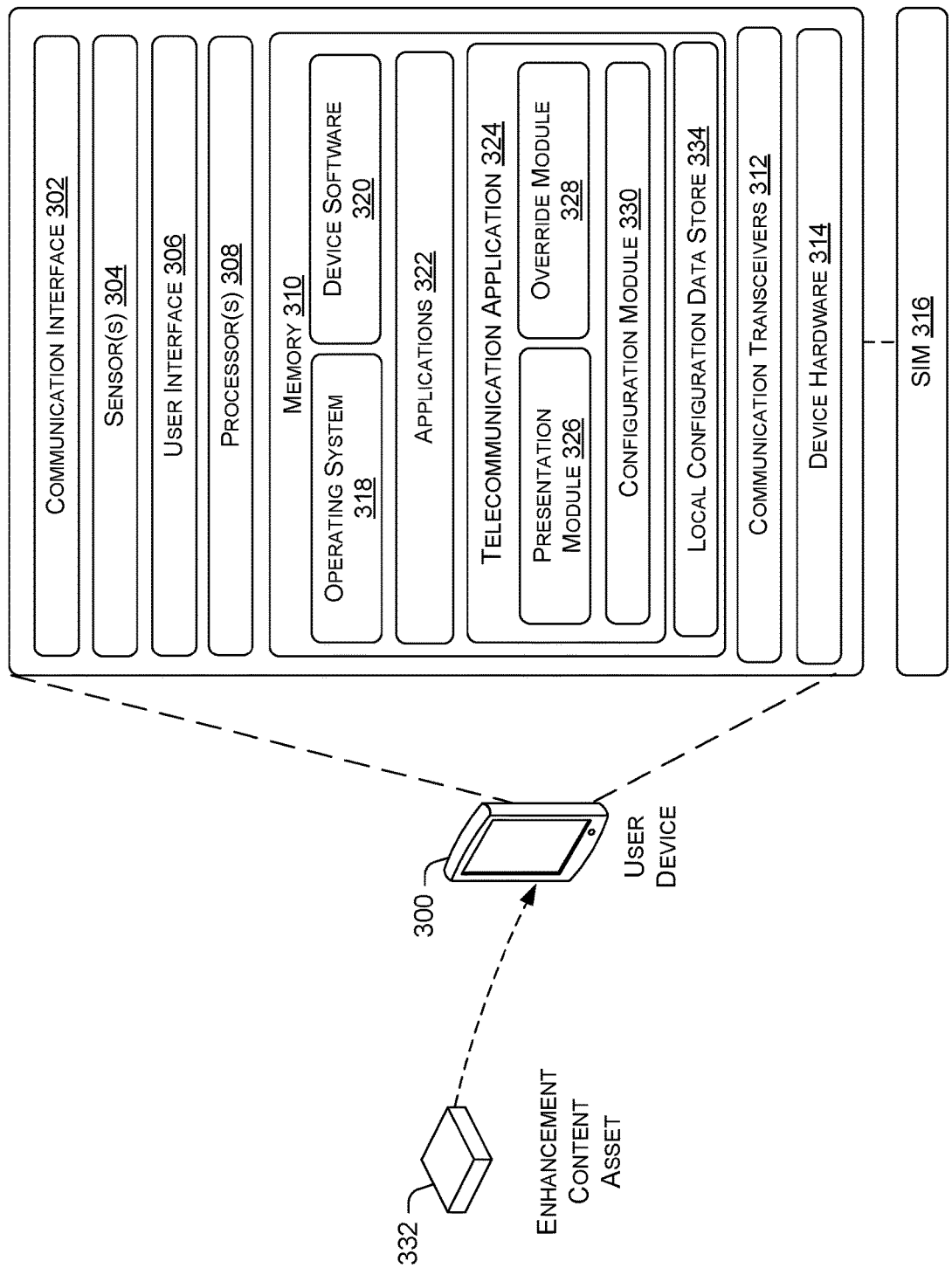
FIG. 3 is a block diagram showing various components of a user device that is configured to present enhancement content assets along with incoming communication alerts.

FIG. 3 is a block diagram showing various components of a user device 300 that is configured to present enhancement content assets along with incoming communication alerts.

The user device 300 may be representative of one of the user devices 108(1)-108(N). The user device 300 may include a communication interface 302, one or more sensors 304, a user interface 306, one or more processors 308, and memory 310. The communication interface 302 may include wireless and/or wired communication components that enable the user device to transmit or receive voice or data communication via the wireless carrier network 102, as well as other telecommunication and/or data communication networks. For example, the communication interface 302 may enable the user device 300 to connect to local area network that is communicatively connected to the wireless carrier network 102, such as a Wi-Fi network, a Bluetooth network, or another type of packet switch wireless network. In some instances, the local area network may be provided by a portable linking device, such as a vehicle's infotainment system using linking protocol (e.g., MirrorLink, Android Auto, etc.). The sensors 304 may include a proximity sensor, a compass, an accelerometer, altimeter, cameras, and/or a global positioning system (GPS) sensor. The proximity sensor may detect movement of objects that are proximate to the user device 300. The compass, the accelerometer, and the GPS sensor may detect orientation, movement, and geolocation of the user device 300.

The user interface 306 may enable a user to provide inputs and receive outputs from the user device 300. The user interface 306 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 310 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital optical disks or other optical storage, magnetic cassettes, magnetic tape, magnetic disk storage or other magnetic storage devices, or any other non-transmission or no-transitory medium that can be used to store information for access by a computing device. In contrast, communication media may embody computer-readable instructions, data structures, program modules, or other data in a modulated data signal, such as a carrier wave, or other transmission mechanism.

The user device 300 may also include communication transceivers 312 and other device hardware 314. The communication transceivers 312 are hardware components that enable the user device 300 to perform telecommunication and data communication with the multiple communications network, such as the wireless carrier network 102. The device hardware 314 may include other hardware that are typically located in a mobile telecommunication device. For example, the device hardware 314 may include signal converters, chipsets, antennas, hardware decoders and encoders, graphic processors, a SIM card slot, and/or the like that enable the user device 300 to execute applications and provide telecommunication and data communication functions. The SIM 316 may be an integrated circuit chip that is inserted into the SIM card slot of the user device 300, or an embedded SIM that is hardwired into the circuit board of the user device 300.

The one or more processors 308 and the memory 310 of the user device 300 may implement an operating system 318, device software 320, one or more applications 322, and a telecommunication application 324. The various software and applications may include routines, program instructions, objects, and/or data structures that perform particular tasks or implement particular abstract data types. The operating system 318 may include components that enable the user device 300 to receive and transmit data via various interfaces (e.g., user controls, communication interface 302, and/or memory input/output devices). The operating system 318 may also process data using the one or more processors 308 to generate outputs based on inputs that are received via the user interface 306. For example, the operating system 318 may provide an execution environment for the execution of the applications 322. The operating system 318 may include a presentation component that presents the output (e.g., display the data on an electronic display, store the data in memory, transmit the data to another electronic device, etc.).

The operating system 318 may include an interface layer that enables applications to interface with the communication transceivers 312 and/or the communication interface 302. The interface layer may comprise public APIs, private APIs, or a combination of both public APIs and private APIs. Additionally, the operating system 318 may include other components that perform various other functions generally associated with an operating system. The device software 320 may include software components that enable the user device to perform functions. For example, the device software 320 may include basic input/output system (BIOS), Boot ROM, or a bootloader that boots up the user device 300 and executes the operating system 318 following power up of the device.

The applications 322 may include applications that provide utility, entertainment, and/or productivity functionalities to a user of the user device 300. For example, the applications 322 may be electronic mail applications, remote desktop applications, web browser applications, navigation applications, office productivity applications, multimedia streaming applications, and/or so forth. The telecommunication application 324 may use the hardware components of the user device 300 to provide telecommunication services to a user via the wireless carrier network 102. For example, the telecommunication application 324 may be a video calling application, a Wi-Fi calling application, a Voice over LTE (VoLTE) application, a Short Message Service (SMS) text messaging application, a Rich Communication Services (RCS) text messaging application, an email application, a chat application, and/or so forth.

In various embodiments, the telecommunication application 324 may include a presentation module 326, an override module 328, and a configuration module 330. The modules may include routines, program instructions, objects, and/or data structures that perform particular tasks or implement particular abstract data types. The presentation module 326 may be responsible for presenting enhancement content assets along with incoming communication alerts. Accordingly, the telecommunication application 324 may receive a paging message for an incoming communication alert. The paging message may include a reference to an enhancement content asset 332 that is to be presented via the user interface 306 of the user device 300. The paging message may further include asset information such as the caller identifier of the caller, group identifier associated with the caller, identification information of the enhancement content asset 332, identification information of the party that generated the enhancement content asset 332, asset type of the enhancement content asset 332, and/or so forth.

In turn, the presentation module 326 may compare the asset information of the enhancement content asset against presentation configuration settings stored in a local configuration data store 334 of the user device 200. The comparison may determine whether the presentation module 326 is to present or suppress the presentation of the enhancement content asset 332. Accordingly, if the presentation module 326 is to present the enhancement content asset 332, the presentation module 326 may use the reference of the enhancement content asset 332 to retrieve the asset for presentation on the user interface 306 along with the incoming communication notification. On the other hand, if the presentation of the enhancement content asset 332 is to be suppressed, the presentation module 326 may refrain from using the reference to retrieve the enhancement content asset 332 for presentation on the user interface 306 along with the incoming communication notification. Alternatively, the presentation module 326 may suppress the presentation of the enhancement content asset 332 by using the reference to retrieve the content asset, then refrain from presenting the retrieved asset and/or discarding the retrieved asset.

The override module 328 may force the presentation of the enhancement content asset 332 despite the presentation configuration setting stored in the local configuration data store 334. In various embodiments, the paging message of the enhancement content asset 332 may include an opt-out override command that overrides an opt-out setting stored in the local configuration data store 334 for the enhancement content asset 332. The opt-out override command may cause the presentation module 326 to bypass the opt-out setting and present the enhancement content asset 332 on the user interface 306 of the user device. Alternatively or concurrently, the paging message of the enhancement content asset 332 may include a device setting override command. The device setting override command may cause the presentation module 326 to override a ringer/speaker muting, a screen blanking, or a do-not-disturb setting of the telecommunication application 324 and/or the operating system 318 so that the enhancement content asset 332 may be presented on the user interface 306.

The configuration module 330 may present a user configuration interface via the user interface 306 of the user device 300. The user configuration interface may enable a user to input opt-in/opt-out settings for whether enhancement content assets are to be presented or suppressed from presentation. The settings may be stored in the local configuration data store 334. Accordingly, the presentation module 326 may suppress enhancement content assets from being presented by the user interface 306 based on the settings stored in the local configuration data store 334.

Example User Interfaces

Figure 4:
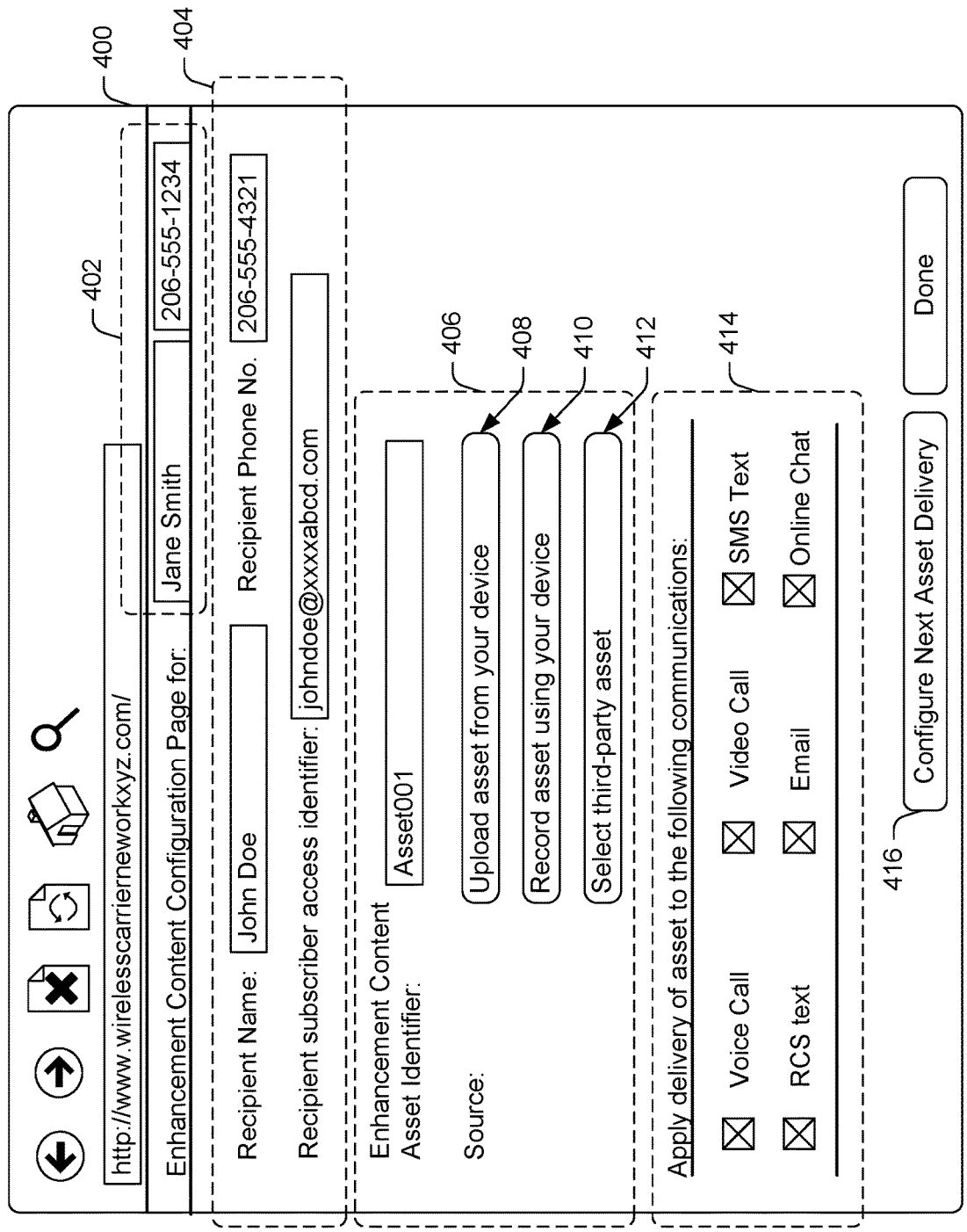
FIG. 4 shows an example network portal page provided by a wireless carrier network for a caller to configure the distribution of enhancement content assets to recipients.

FIG. 4 shows an example network portal page 400 provided by a wireless carrier network for a caller to configure the distribution of enhancement content assets to recipients. The network portal page 400 may display the information of the caller in section 402, and the section 404 may enable the caller to select a recipient user device that is intended to receive an enhancement content asset. The recipient user device may be selected via a recipient name, a recipient phone number, e.g., MSISDN, and/or a recipient subscriber access identifier, e.g., subscriber email address. Other embodiments of the section 404 may allow the caller to select a recipient user device via other identifiers, e.g., an IMEI, a subscriber access identifier, etc., to receive the enhancement content asset. Section 406 may enable the caller to select a particular enhancement content asset for displaying along with a communication to the recipient as initiated by the caller. In various embodiments, section 406 may include an option 408 that enables the caller to upload an asset from a user device of the caller to the media store 134 of the wireless carrier network 102. An option 410 in section 406 may provide the caller with the ability to record an enhancement content asset using media input devices of the user device, in which the asset is then uploaded to the media store 134.

Section 406 may further include an option 412 that enables the caller to select a third-party asset for distribution with a communication to the recipient. For example, the selection of the option 412 may open another user page that enables the caller to select enhancement content assets via listings of various third-party content providers and their associated content assets. Section 414 provides the caller with the ability to select the types of communication for which the particular enhancement content asset is to be delivered. For example, the types of communications may include voice calls, video calls, SMS texts, RCS texts, MMS texts, email, online chats, and/or so forth. The selection option 416 may be activated to configure another enhancement content asset for distribution to the recipient or another recipient.

Figure 5:
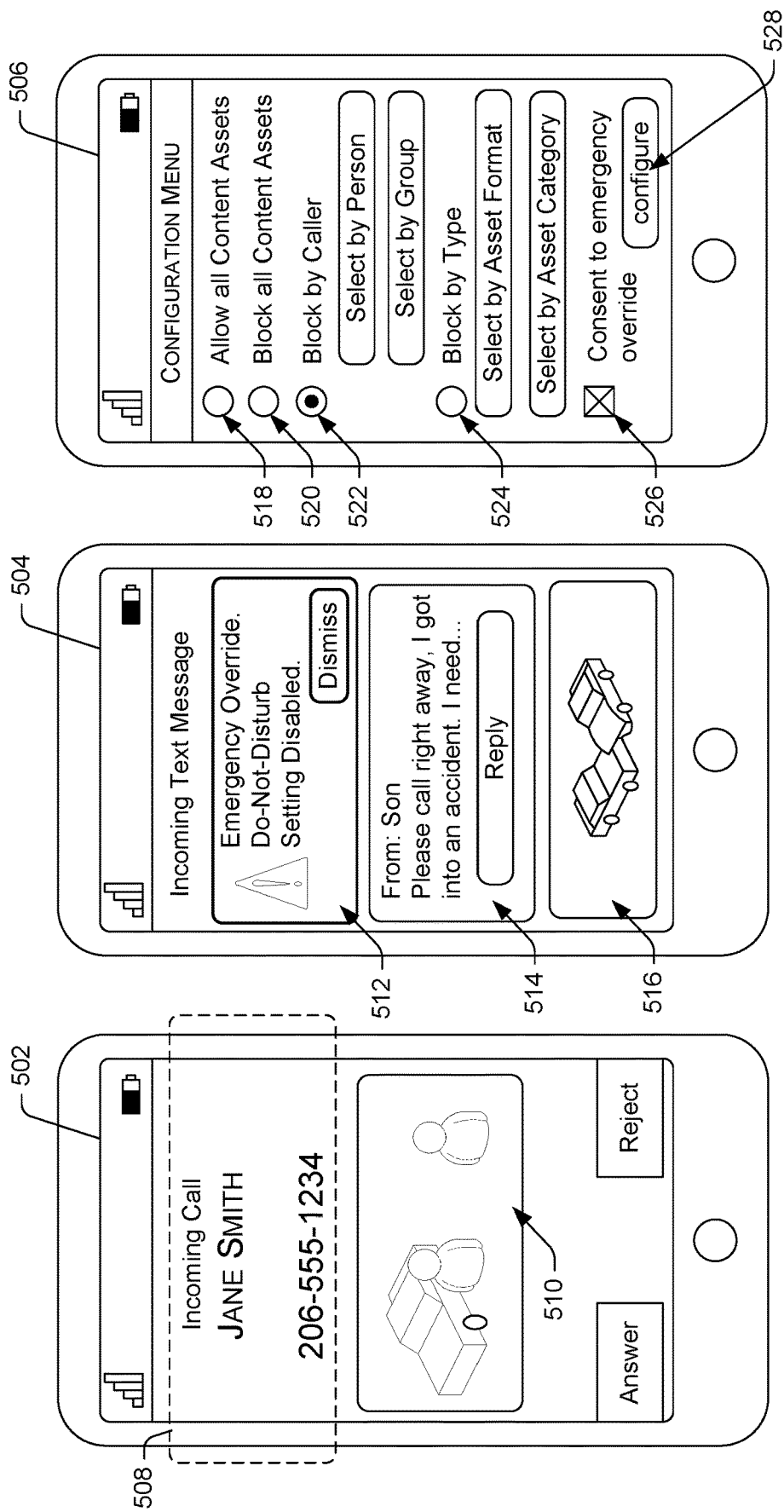
FIG. 5 shows example user configuration interfaces displayed on a user device of a recipient that are related to the presentation of enhancement content assets.

FIG. 5 shows example user configuration interfaces displayed on a user device of a recipient that are related to the presentation of enhancement content assets. The user configuration interfaces include a user configuration interface 502, a user configuration interface 504, and a user configuration interface 506. The user configuration interface 502 illustrates an incoming call alert 508 that shows information of the caller. The user configuration interface 502 may further display an enhancement content asset 510 in the form of a multimedia video that is automatically presented along with the incoming call alert 508.

The user configuration interface 504 illustrates the activation of an emergency override that supersedes an opt-out setting and/or a user interface setting of the user device. For example, the user may have opted-out of receiving enhancement content assets in the forms of still images and multimedia videos. Further, the user may also have turned on a do-not-disturb setting on the user device to disable the presentation of incoming communication alerts. However, a caller may have initiated an emergency override of the opt-out setting and the do-not disturb setting. As a result, the user configuration interface 504 may display a message 512 indicating that the emergency override was initiated by the caller. Additionally, an incoming communication alert in the form of a text message preview 514 may be displayed. The user configuration interface 504 may further display an enhancement content asset 516 in the form a still image.

The user configuration interface 506 illustrates a configuration menu that enables the recipient to opt-in or opt-out of receiving enhancement content assets. The configuration menu may include an option 518 that enables a recipient to allow all enhancement content assets to be displayed and an option 520 that enables the recipient to block all enhancement content assets from being displayed. Additionally, an option 522 may enable the recipient to block receiving enhancement content assets from a specific caller or a specific group of callers. The configuration menu may further include an option 524 that enables the recipient to block receiving specific types of enhancement content assets. For example, the recipient may select specific enhancement content assets to be blocked according to asset format or asset type. Further, the configuration menu may include an option 526 for consenting to emergency override of enhancement content asset opt-out settings, in which the activation of a configuration command 528 may enable the recipient to authorize specific callers to override the opt-out settings.

Example Processes

FIG. 6-12 present illustrative processes 600-1200 for an incoming communication enhancement function provides enhancement content assets along with incoming communication alerts. Each of the processes 600-1200 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-700 are described with reference to the network architecture 100 of FIG. 1.

Figure 6:
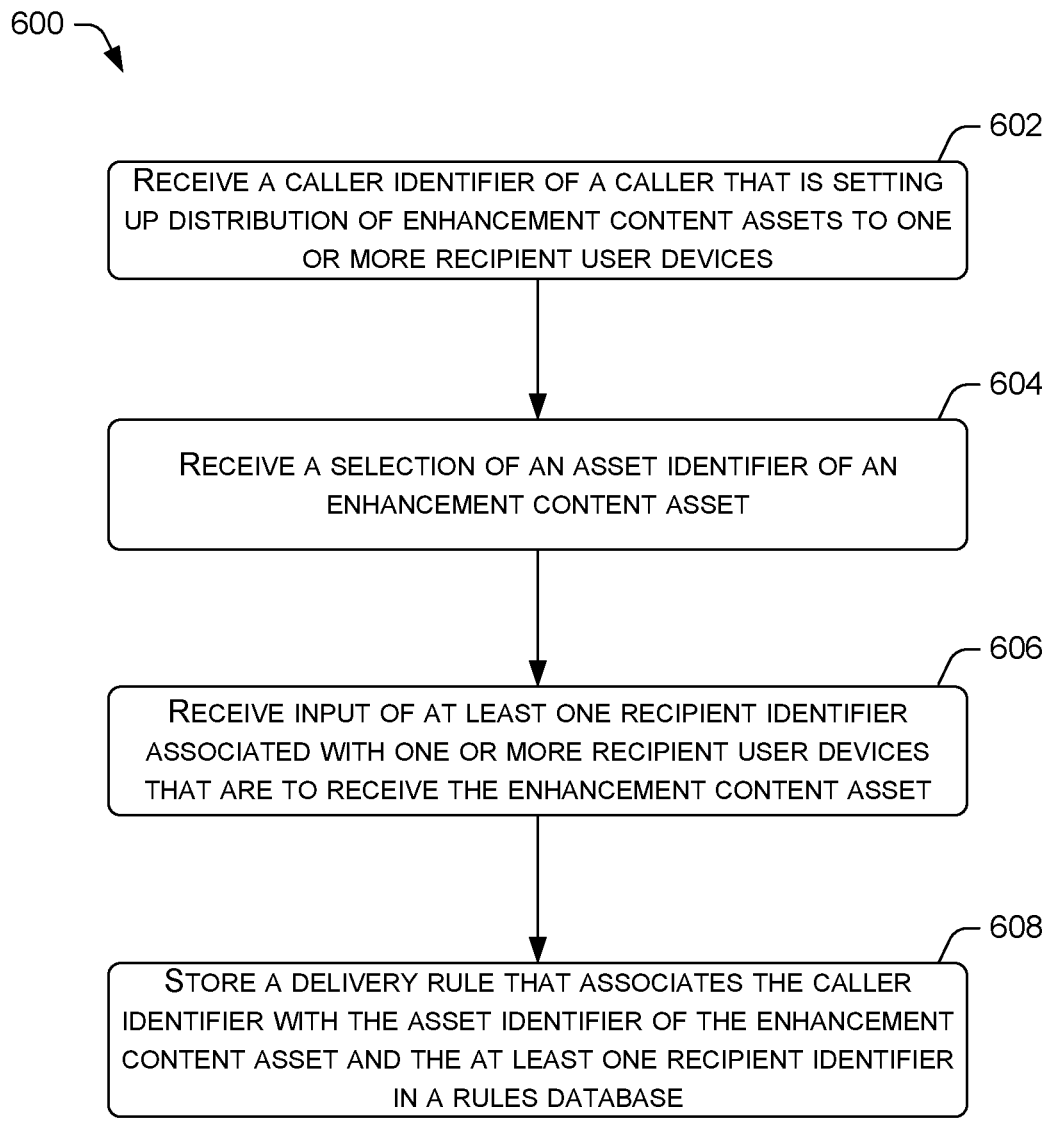
FIG. 6 is a flow diagram of an example process for using a delivery rule to configure the distribution of an enhancement content asset to one or more recipient devices by a wireless carrier network.

FIG. 6 is a flow diagram of an example process 600 for using a delivery rule to configure the distribution of an enhancement content asset to one or more recipient devices by a wireless carrier network. At block 602, the ECS 130 may receive a caller identifier of a caller that is setting up distribution of enhancement content asset to one or more recipient user devices. In various embodiments, the ECS 130 may receive the caller identifier via a network portal that is provided by the wireless carrier network 102. The caller identifier may be a MSISDN, an IMEI, an IMSI, a MEID in the form of an ESN, and/or a subscriber access identifier that is assigned by the wireless carrier network 102 to identifier the caller as a subscriber of the wireless carrier network 102.

At block 604, the ECS 130 may receive a selection of an asset identifier of an enhancement content asset. The identifier may belong to an enhancement content asset that is generated by the caller or provided by a third-party content provider, in which the enhancement content asset may be stored in the media store 134 or at a data store of the third-party content provider.

At block 606, the ECS 130 may receive input of at least one recipient identifier associated with one or more recipient user devices that are to receive the enhancement content asset. In various embodiments, a recipient identifier may be a MSISDN, an IMEI, an IMSI, a MEID in the form of an ESN, and/or a subscriber access identifier that is assigned by the wireless carrier network 102 to identifier the recipient as a subscriber of the wireless carrier network 102. At block 608, the ECS 130 may store a delivery rule in the rules database 228 that associates the caller identifier, the identifier of the enhancement content asset, and the one or more recipient identifiers.

Figure 7:
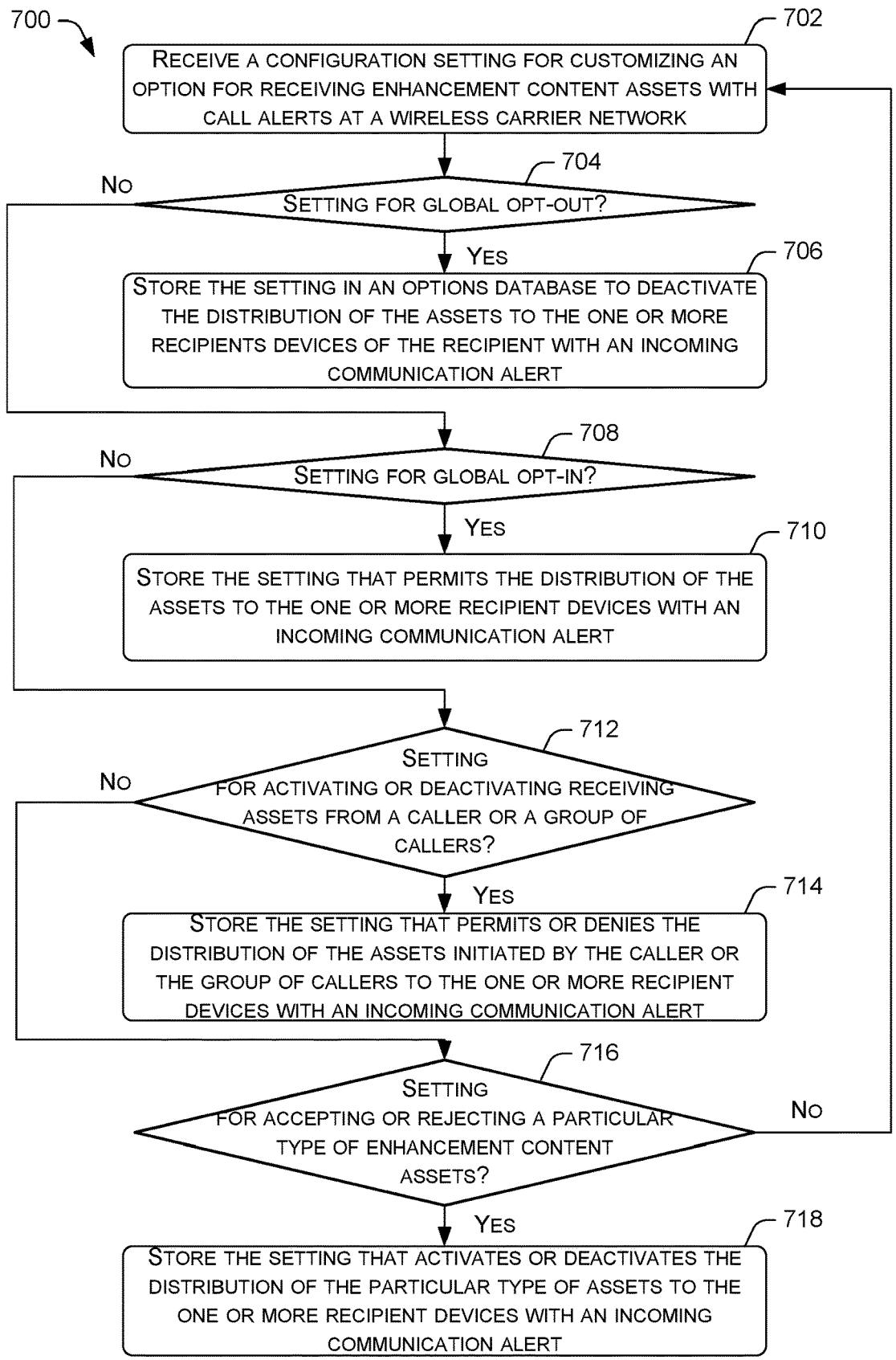
FIG. 7 is a flow diagram of an example process for customizing a wireless carrier network to selectively distribute enhancement content assets to one or more recipient devices based on a configuration setting.

FIG. 7 is a flow diagram of an example process 700 for customizing a wireless carrier network to selectively distribute enhancement content assets to one or more recipient devices based on a configuration setting. At block 702, the ECS 130 of the wireless carrier network 102 may receive a configuration setting for customizing an option for receiving enhancement content assets with call alerts. The configuration setting may be received from a network subscriber of the wireless carrier network 102, in which the configuration setting may be inputted via a user interface of a user device, or a network portal provided by the wireless carrier network 102.

At decision block 704, the ECS 130 may determine whether the setting is for globally opting-out of receiving all enhancement content assets. Accordingly, if the setting is for globally opting-out ("yes" at decision block 704), the process 700 may proceed to block 706. At block 706, the ECS 130 may store the setting in the options database 230 to deactivate the distribution of enhancement content assets to the one or more recipient devices of the recipient along with an incoming communication alert that is sent to the one or more recipient devices.

However, if the setting is not a global opting-out setting ("no" at decision block 704), the process 700 may proceed to decision block 708. At decision block 708, the ECS 130 may determine whether the setting is for globally opting-in receiving enhancement content assets. Accordingly, if the setting is for globally opting-in ("yes" at decision block 708), the process 700 may proceed to block 710. At block 710, the ECS 130 may store the setting in the options database 230 to permit the distribution of enhancement content assets to the one or more recipients of recipient with an incoming communication alert.

However, if the setting is not a global opting-in setting ("no" at decision block 704), the process 700 may proceed to decision block 712. At decision block 712, the ECS 130 may determine whether the setting is for activating or deactivating receiving enhancement content assets from a caller or a group of callers. Accordingly, if the setting is for activating or deactivating receiving enhancement content assets from a caller or a group of callers ("yes" at decision block 712), the process 700 may proceed to block 714. In various embodiments, the setting may include a caller identifier of a caller or a group identifier of a group of callers for which the recipient permits or denies an ability to send enhancement content assets to the one or more recipient devices. At block 714, the ECS 130 may store the setting that permits the distribution of enhancement content initiated by the caller or the group of callers to the one or more recipient devices of the recipient along with an incoming communication alert in the options database 230. In alternative embodiments, the ECS 130 may store the setting that denies the distribution of enhancement content assets along with an incoming communication alert in the options database 230.

However, if the setting is not for activating or deactivating receiving enhancement content assets from a caller or a group of callers ("no" at decision block 712), the process 700 may proceed to decision block 716. At decision block 716, the ECS 130 may determine whether the setting is for accepting or rejecting a particular type of enhancement content assets. In various embodiments, the particular type of enhancement content assets may be assets having a specific asset format or a specific asset category. Accordingly, if the setting is for accepting or rejecting a particular type of enhancement content assets ("yes" at decision block 716), the process 700 may proceed to block 718. At block 718, the ECS 130 may store the setting that activates the distribution of the particular type of enhancement content asset to the one or more recipient devices along with an incoming communication alert in the options database 230. In alternative embodiments, the ECS 130 may store the setting that deactivates of the particular type of enhancement content asset to the one or more recipient devices along with an incoming communication alert in the options database 230.

Figure 8:
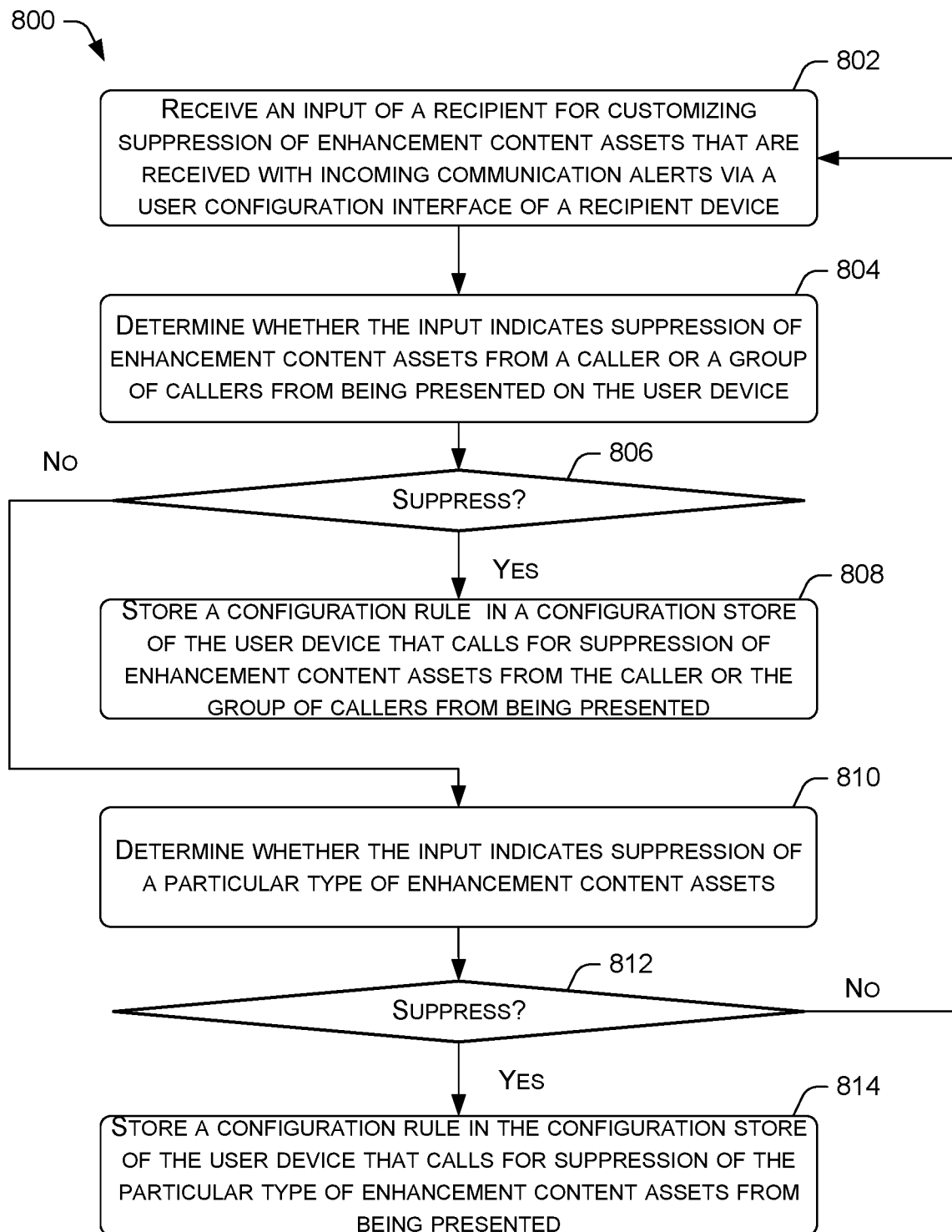
FIG. 8 is a flow diagram of an example process for selectively suppressing the presentation of an enhancement content asset on a recipient device based on an input of a recipient at a configuration interface on the recipient device.

FIG. 8 is a flow diagram of an example process 800 for selectively suppressing the presentation of an enhancement content asset on a recipient device based on an input of a recipient at a configuration interface on the recipient device. At block 802, a user device of a recipient, such as the user device 108(N), may receive an input for customizing suppression of enhancement content assets that are received with incoming communication alerts via a user configuration interface of the recipient device. At block 802, the user device may determine whether the user input indicates suppression of enhancement content assets from a caller or a group of callers from being presented on the user device. At decision block 806, if the user device determines that the user input indicates such a suppression ("yes" at decision block 806), the process 800 may proceed to block 808. At block 808, the user device may store a configuration rule in a configuration store of the user device that calls for suppression of enhancement content assets from the caller or the group of callers from being presented on the user device.

However, if the user device determines that the user input does not indicate such suppression ("no" at decision block 806), the process 800 may proceed to block 810. At block 810, the user device may determine whether the input indicates suppression of a particular type of enhancement content assets. In various embodiments, the particular type of enhancement content assets may be assets having a specific asset format or a specific asset category. At decision block 812, if the user device determines that input indicates such a suppression ("yes" at decision block 812), the process 800 may proceed to block 814. At block 814, the user device may store a configuration rule in the configuration store of the user device that calls for suppression of the particular type of enhancement content assets from being presented. However, if the user device determines that the user input does not indicate such suppression ("no" at decision block 812), the process 800 may loop back to block 802.

Figure 9:
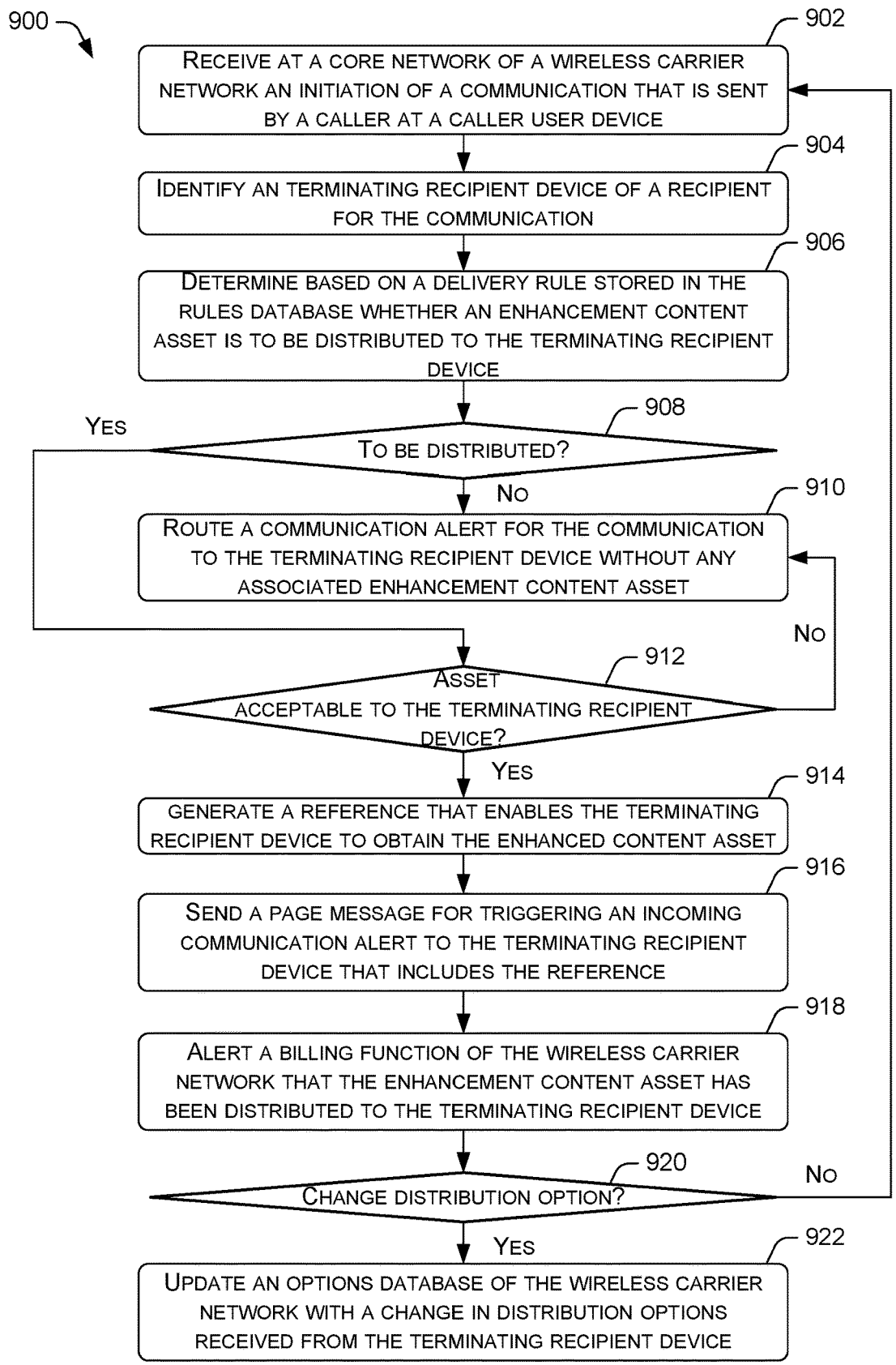
FIG. 9 is a flow diagram of an example process for routing an enhancement content asset in conjunction with an incoming communication alert to a recipient device of a recipient.

FIG. 9 is a flow diagram of an example process 900 for routing an enhancement content asset in conjunction with an incoming communication alert to a recipient device of a recipient. At block 902, the core network 104 of the wireless carrier network 102 may receive an initiation of a communication that is sent by a caller at a caller user device. For 3G-based communication, incoming communication may arrive at the SGSN 112 of the wireless carrier network 102, and incoming LTE-based communication may arrive at the P-SCSF 120 of the wireless carrier network 102. In some instances, the caller user device may be connected to a local area network that is communicatively connected to the wireless carrier network 102. For example, the local area network may be a Wi-Fi network, a Bluetooth network, or another type of packet switched wireless network. In such instances, the local area network may receive the initiation of the communication from the caller user device, and then send the initiation of the communication to the wireless carrier network 102. The communication as initiated may include a recipient identifier for the recipient of the communication.

At block 904, the core network 104 may identify a terminating recipient device of a recipient that is to receive the communication initiated by the caller at the caller user device. In this way, the communication may be routed to the terminating recipient device. In various embodiments, the I-SCSF 122 of the core network 104 may use the HSS 126 or the PCRF 116 to obtain a recipient device identifier of the terminating recipient device based on the recipient identifier. For example, the core network 104 may identify a MSISDN or a subscriber access identifier that is associated with the terminating recipient device based on the recipient identifier. However, because in some instances the subscriber access identifier is associated with multiple user devices, the recipient device identifier that is obtained by the I-SCSF 122 may further include a device identifier (e.g., IMEI), in order to identify the terminating recipient device. Subsequently, the S-CSCF 124 of the core network 104 may provide a caller user device identifier of the caller user device and the recipient device identifier of the terminating recipient device to the ECS 130. The caller user device identifier may be provided by the caller user device as part of caller user device attachment procedure during the incoming communication initiation.

At block 906, the ECS 130 may determine based on a delivery rule stored in the rules database 228 whether an enhancement content asset is to be delivered to the terminating recipient device. Accordingly, at decision block 908, if the ECS 130 determines that the enhancement content asset is not to be delivered ("no" at decision block 908), the process 900 may proceed to block 910. At block 910, the ECS 130 may route a communication alert for the communication to the terminating recipient device without any associated enhancement content asset. In some embodiments, the ECS 130 may send an indication to the caller user device indicating that the sending of the enhancement content to the terminating user device is not allowed.

However, if the ECS 130 determines that the enhancement content asset is to be delivered ("yes" at decision block 908), the process 900 may proceed to decision block 912. At decision block 912, the ECS 130 may determine whether the enhancement content asset is acceptable to the terminating recipient device. In various embodiments, the ECS 130 may check configuration settings in the options database 230 to determine whether the recipient has configured terminating recipient device to receive the enhancement content asset. Accordingly, if the terminating recipient device is configured to accept the enhancement content asset, the process 900 may proceed to block 914.

At block 914, the ECS 130 may generate a reference that enables the terminating recipient device to obtain the enhanced content asset. In various embodiments, the reference may enable the terminating recipient user device to retrieve the enhancement content asset from the media store 134 of the wireless carrier network 102 or a server of a third-party content provider.

At block 916, the ECS 130 may prompt the SGSN 112 or the TAS server of the core network 104 to send a page message (or another equivalent message) for triggering an incoming communication alert to the terminating recipient device that includes the reference. In some instances, the terminating recipient device may be connected to a local area network that is communicatively connected to the wireless carrier network 102. For example, the local area network may be a Wi-Fi network, a Bluetooth network, or another type of packet switched wireless network. The local area network may be the same network that the caller user device is connected to, or a different local area network. In such instances, the local area network may receive the page message from the wireless carrier network 102, and in turn send the page message to the terminating recipient device. At block 918, the ECS 130 may alert a billing function of the wireless carrier network that the enhancement content asset has been delivered to the terminating recipient device. In various embodiments, the billing function may be an Online Charging System (OCS) or another equivalent core network component of the wireless carrier network.

At decision block 920, the ECS 130 may determine whether a change to distribution options for enhancement content assets is received. In various embodiments, the change may be inputted via a network portal of the wireless carrier network 102 or a user configuration interface of a terminating user device. The change may activate or deactivate the distribution of enhancement content assets from different callers or assets of different types to the terminating user device. Accordingly, if the ECS 130 determines a change to distribution options for the enhancement content assets is received ("yes" at decision block 920), the process 900 may proceed to block 922. At block 922, the ECS 130 may update the options database 230 of the wireless carrier network 102 with the change in distribution options from the terminating recipient device.

Returning to decision block 912, if the terminating recipient device is configured to reject the enhancement content asset, the process 900 may loop back to block 910. In some embodiments, the ECS 130 may further send an indication to the caller user device indicating that the sending of the enhancement content to the terminating user device is not allowed.

Figure 10:
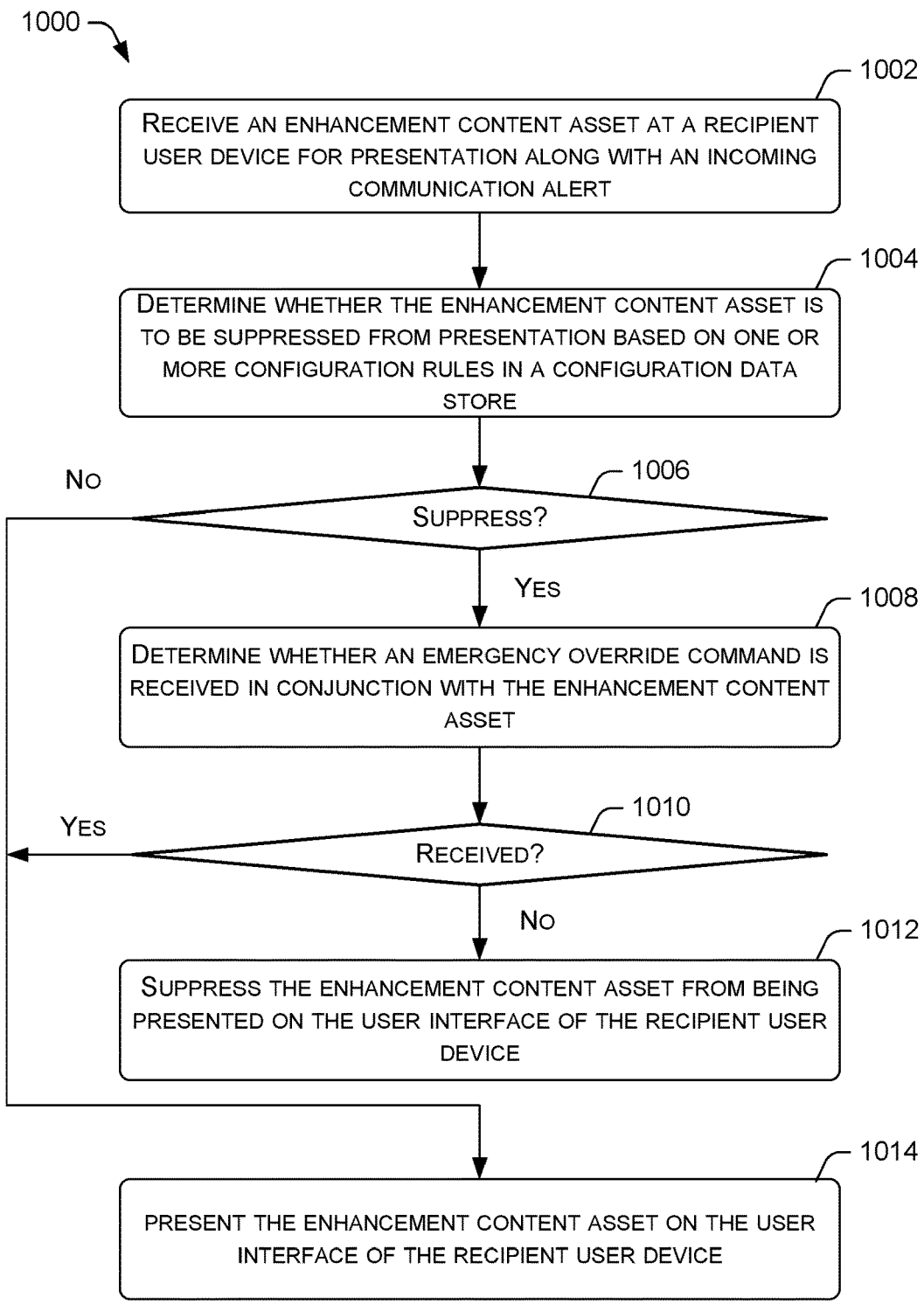
FIG. 10 is a flow diagram of an example process for overriding an enhancement content suppression setting on a recipient device to present an enhancement content asset on a user interface of the recipient device along with an incoming communication alert.

FIG. 10 is a flow diagram of an example process 1000 for overriding an enhancement content suppression setting on a recipient user device to present an enhancement content asset on a user interface of the recipient user device along with an incoming communication alert. At block 1002, a recipient user device may receive an enhancement content asset for presentation along with an incoming communication alert. In various embodiments, the recipient user device may receive the enhancement content asset by using a received reference to the asset to retrieve the asset from the wireless carrier network 102 or a third-party content provider.

At block 1004, the recipient user device may determine whether the enhancement content asset is to be suppressed from presentation based on one or more configuration rules in a local configuration data store of the user device. Accordingly, at decision block 1006, if the recipient user device determines based on the one or more configuration rules that the enhancement content asset is to be suppressed, the process 1000 may proceed to block 1008. At block 1008, the recipient user device may determine whether an emergency override command is received in conjunction with the enhancement content asset. The emergency override command may be an opt-out override command and/or a device setting override command. The opt-out override command may cause the user device to bypass the opt-out setting and present the enhancement content asset on the user interface of the recipient user device. The device setting override command may cause the user device to override a ringer/speaker muting, a screen blanking, or a do-not-disturb setting of the recipient user device so that the enhancement content asset may be presented on the user interface of the recipient user device.

Thus, at decision block 1010, if the recipient user device determines that the emergency override command for altering the suppression of the enhancement content asset from presentation is not received ("no" at decision block 1010), the process 1000 may proceed to block 1012. At block 1012, the recipient user device may suppress the enhancement content asset from being presented on the user interface of the recipient user device. In alternative embodiments, the recipient user device may not have retrieved the enhancement content asset at block 1002, i.e., block 1002 is not initially performed. Rather, the recipient user device may refrain from using the reference to retrieve the enhancement content asset in response to determining that the enhancement content asset is to be suppressed from presentation at decision block 1006 and no emergency override command for altering the suppression is received at decision block 1010.

However, if the recipient user device determines that an emergency override command for altering the suppression of the enhancement content asset is received ("yes" at decision block 1010), the process 1000 may proceed to block 1014. In alternative embodiments, the recipient user device may not have retrieved the enhancement content asset, i.e., block 1002 is not initially performed. Rather, the recipient user device may use the reference to retrieve the enhancement content asset in response to determining that the enhancement content asset is to be suppressed from presentation at decision block 1006 but the emergency override command for altering the suppression is received at decision block 1010.

At block 1014, the recipient user device may present the enhancement content asset on the user interface of the recipient user device. Returning to decision block 1006, if the recipient user device determines based on the one or more configuration rules that the enhancement content asset is not to be suppressed, the process 1000 may proceed directly to block 1014. In alternative embodiments, the recipient user device may not have retrieved the enhancement content asset, i.e., block 1002 is not initially performed. Rather, the recipient user device may use the reference to retrieve the enhancement content asset in response to determining that the enhancement content asset is not to be suppressed prior to performing block 1014.

Figure 11:
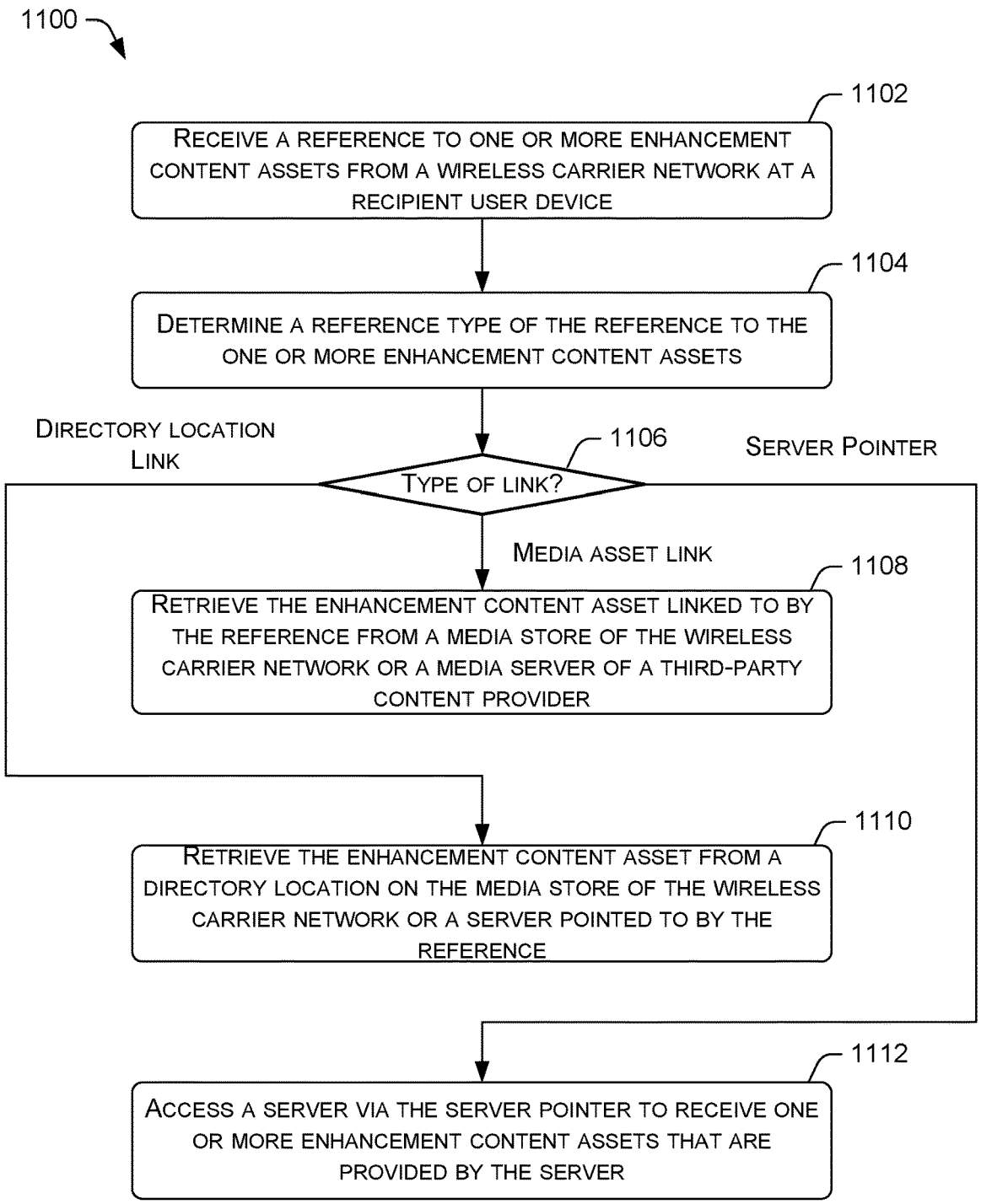
FIG. 11 is a flow diagram of an example process for a recipient device to use a reference received from a wireless carrier network to retrieve an enhancement content asset for presentation on a recipient device along with an incoming communication alert.

FIG. 11 is a flow diagram of an example process 1100 for a recipient user device to use a reference received from a wireless carrier network to retrieve an enhancement content asset for presentation on a recipient user device along with an incoming communication alert. At the block 1102, a recipient user device may receive a reference to one or more enhancement content asset from a wireless carrier network 102. At block 1102, the recipient user device may determine a reference type of the reference to the one or more enhancement content assets. At decision block 1106, if the reference is a media asset link, the process 1100 may proceed to block 1108. At block 1108, the user device may retrieve the enhancement content asset linked to by the reference from a media store 134 of the wireless carrier network 102 or a media server of a third-party content provider 136. In various embodiments, the reference is a link or pointer to a specific enhancement content asset that is stored on the media store 134 or at a media server of a third-party content provider 136.

At decision block 1106, if the reference is a directory location link, the process 1100 may proceed to block 1110. At block 1110, the user device may retrieve the enhancement content asset from a directory location on the media store 134 of the wireless carrier network 102 or a server pointed to by the reference. In various embodiments, the server pointed to the reference may be a server of the wireless carrier network 102 or a third-party content provider 136.

At decision block 1106, if the reference is a server pointer, the process 1100 may proceed to block 1112. At block 1112, the user device may use the server pointer to access a server to receive one or more enhancement content assets that are provided by the server. In various embodiments, the server may reside on the wireless carrier network 102 or with a third-party content provider 136.

Figure 12:
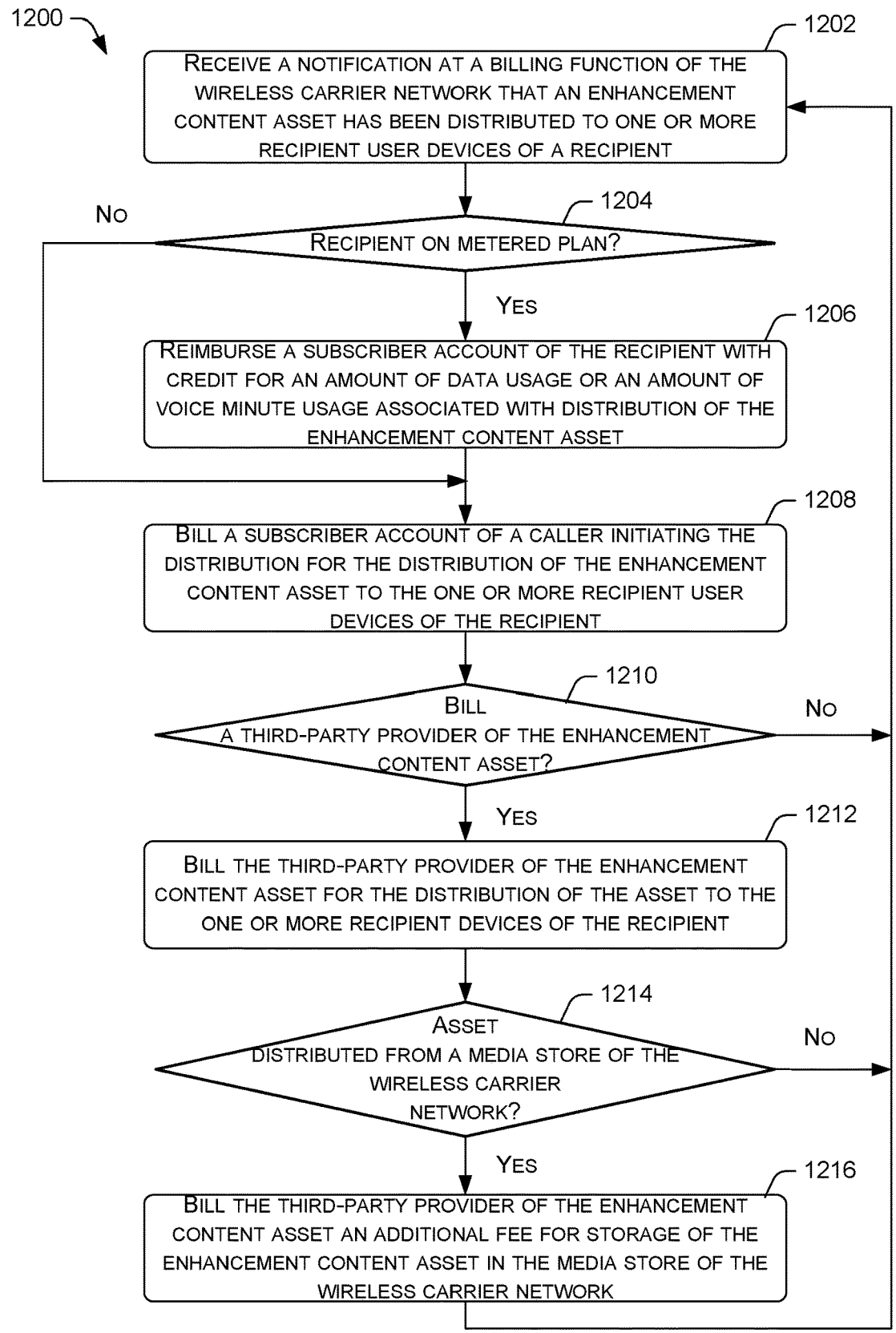
FIG. 12 is a flow diagram of an example process for a billing function of the wireless carrier network to manage credit back and billing in association with the presentation of enhancement content assets along with incoming communication alerts.

FIG. 12 is a flow diagram of an example process 1200 for a billing function of the wireless carrier network to manage credit back and billing in association with the presentation of enhancement content assets along with incoming communication alerts. At block 1202, a billing function of the wireless carrier network 102 may receive a notification at a billing function of the wireless carrier network that an enhancement content asset has been delivered to one or more recipient user devices of a recipient. At decision block 1204, the billing function may determine whether the network subscriber plan of the recipient is a metered plan. Accordingly, if the network subscriber plan of the recipient is a metered plan ("yes" at decision block 1204), the process 1200 may proceed to block 1206. At block 1206, the billing function may reimburse a subscriber account of the recipient with credit for an amount of data usage or an amount of voice minute usage associated with the distribution of the enhancement content asset to the recipient device.

At block 1208, the billing function may bill a subscriber account of a caller who initiated the distribution for the distribution of the enhancement content asset to the one or more recipient user devices of the recipient. At decision block 1210, the billing function may determine whether a third-party content provider may be billed for the distributed of the enhancement content asset. In various embodiments, the billing function may bill the third-party content provider of the enhancement content asset when there is a contract between the provider and the operator of the wireless carrier network 102 for the provider to be billed when for the distribution of impressions of the enhancement content asset. Accordingly, if the billing function determines that the third-party content provider of the enhancement content asset is to be billed ("yes" at decision block 1210), the process 1200 may proceed to block 1212. At block 1212, the billing function may bill the third-party content provider of the enhancement content asset for distribution of the asset to the one or more recipient devices of the recipient.

At decision block 1214, the billing function may determine whether the enhancement content asset is delivered from the media store 134 of the wireless carrier network 102. Accordingly, if the enhancement content asset is delivered from the media server ("yes" at decision block 1214), the process 1200 may proceed to block 1216. At block 1216, the billing function may bill the third-party provider of the enhancement content asset an additional fee for storage of the enhancement content asset in the media store 134 of the wireless carrier network 102. The additional fees may compensate the wireless carrier network 102 for storing and/or filtering the enhancement content assets.

However, if the enhancement content asset is not delivered from the media server ("no" at decision block 1214), the process 1200 may loop back to block 1202. Returning to decision block 1204, if the network subscriber plan of the recipient is not a metered plan ("no" at decision block 1204), the process 1200 may proceed directly to block 1206. Returning to decision block 1210, if the billing function determines that the third-party content provider of the enhancement content asset is not to be billed ("no" at decision block 1210), the process 1200 may loop back to block 1202.

The presentation of an enhancement content asset along with an incoming communication alert may provide additional information regarding the nature of the incoming communication. The enhancement content asset may be in the form of a text message, a social media feed, a rich media file, audio content, still image content, video content, multimedia content, web page scripts, uniform resource locators (URLs), other types of links to content and/or applications, and/or so forth that provide further information or context for an incoming communication. Accordingly, the enhancement content asset that is presented along with an incoming communication alert may serve to provide additional context for the recipient to determine whether to accept or reject the incoming communication. In other instances, the enhancement content asset may provide background information that assists the recipient in having a more productive or efficient communication exchange with the caller.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media of a user device storing computer-executable instructions that upon execution cause one or more processors to perform acts comprising:

receiving an enhancement content asset at the user device for presentation along with an incoming communication alert for a communication that is initiated on a caller user device and routed to the user device via a wireless carrier network, the enhancement content asset including multimedia content that is purchased by a caller of the caller user device for presentation on the user device;

determining, based on a configuration rule in a configuration data store of the user device, whether the enhancement content asset is to be suppressed from presentation on a user interface of the user device for a presentation of the incoming communication alert or presented along with the incoming communication alert on the user interface;

in response to the configuration rule indicating that the enhancement content asset is to be suppressed from presentation along with the presentation of the incoming communication alert on the user interface:
    suppressing the enhancement content asset that includes the multimedia content purchased by the caller of the caller user device for presentation on the user device from being presented along with the incoming communication alert, and
    presenting the incoming communication alert on the user interface; and in response to the configuration rule indicating the enhancement content asset is permitted to be presented, presenting the enhancement content asset along with the incoming communication alert on the user interface of the user device.

2. The one or more non-transitory computer-readable media of claim 1, wherein the acts further comprise:

receiving an additional enhancement content asset at the user device for presentation along with an additional incoming communication alert for an additional communication that is initiated on the caller user device and routed to the user device via the wireless carrier network, the additional enhancement content asset being accompanied by an emergency override command;

overriding at least one of an additional configuration rule in the configuration data store or a user interface setting of the user device that prevents presentation of the additional enhancement content asset in response to the emergency override command; and presenting the additional enhancement content asset along with the additional incoming communication alert on the user device.

3. The one or more non-transitory computer-readable media of claim 1, wherein the receiving the enhancement content asset includes:

receiving a reference that enables the user device to obtain the enhancement content asset from the wireless carrier network or a third-party content provider; and retrieving the enhancement content asset from the wireless carrier network or the third-party content provider via the reference.

4. The one or more non-transitory computer-readable media of claim 3, wherein the reference is a specific media asset link for the enhancement content asset stored in a media store of the wireless carrier network or a media server of the third-party content provider, a directory location link to a directory location on the media store of the wireless carrier network or the media server of the third-party content provider, or a server pointer to a server of the wireless carrier network or the third-party content provider that is responsible for generating and providing the enhancement content asset.

5. The one or more non-transitory computer-readable media of claim 3, wherein the reference is generated by a server located at a core network of the wireless carrier network.

6. The one or more non-transitory computer-readable media of claim 1, wherein the acts further comprise:

receiving an input via a user configuration interface displayed on the user device, the input indicating that enhancement content assets as initiated by a caller, or a group of callers that includes the caller, are to be suppressed from presentation on the user interface of the user device; and storing a corresponding configuration rule in the configuration data store that prevents the enhancement content assets initiated by the caller or the group of callers from being presented or retrieved via associated references of the enhancement content assets for presentation.

7. The one or more non-transitory computer-readable media of claim 1, wherein the acts comprise:

receiving an input via a user configuration interface displayed on the user device, the input indicating suppression of enhancement content assets of a particular asset format or asset category; and storing a corresponding configuration rule in the configuration data store that prevents the enhancement content assets of the particular asset format or asset category from being presented or retrieved via associated references of the enhancement content assets for presentation.

8. The one or more non-transitory computer-readable media of claim 1, wherein the communication includes a voice call, a video call, an email message, a text message, or a chat message, and wherein the enhancement content asset further includes an additional text message, a social media feed, a rich media file, audio content, still image content, video content, web page scripts, a uniform resource locator (URL), or a link to at least one of content or an application.

9. The one or more non-transitory computer-readable media of claim 8, wherein the text message is a Short Message Service (SMS) message, a Multimedia Message Service (MMS) message, or a Rich Communication Services (RCS) message.

10. The one or more non-transitory computer-readable media of claim 8, wherein the text message is a Unicode or Multibyte Character Set (MBCS) text message that supports encoding of multiple languages.

11. The one or more non-transitory computer-readable media of claim 1, wherein the enhancement content asset is generated by a government entity, or generated by an interactive voice response (IVR) application or service that provides the enhancement content asset to the user device in response to an information request initiated by a recipient via the user device.

12. The one or more non-transitory computer-readable media of claim 1, wherein the communication is routed through a serving GPRS support node (SGSN) or a Proxy Call Session Control Function (P-CSCF) of the wireless carrier network.

13. The one or more non-transitory computer-readable media of claim 9, wherein the communication is routed to the user device based on a recipient identifier associated with the user device, the recipient identifier including a Mobile Station International Subscriber Directory Number (MSISDN), an International Mobile Equipment Identity (IMEI), an International Mobile Subscriber Identity (IMSI), a Mobile Equipment Identifier (MEID), or a subscriber access identifier, and wherein the subscriber access identifier is used by the wireless carrier network to authenticate a user for providing the user with access to multiple services or applications that are hosted by the wireless carrier network or hosted by third-party providers.

14. A user device, comprising:

one or more processors; and memory having instructions stored therein, the instructions, when executed by the one or more processors, cause the one or more processors to perform acts comprising:

receiving an incoming communication alert at the user device for a communication that is initiated on a caller user device and routed to the user device via a wireless carrier network;

receiving a reference that enables the user device to obtain an enhancement content asset from the wireless carrier network or a third-party content provider for presentation along with the incoming communication alert via a user interface of the user device;

in response to a configuration rule in a configuration data store of the user device indicating that the enhancement content asset is permitted to be presented, retrieving the enhancement content asset from a media store of the wireless carrier network or the third-party content provider via the reference and present the enhancement content asset along with the incoming communication alert on the user interface; and in response to the configuration rule indicating that the enhancement content asset is to be suppressed from presentation on the user interface:

retrieving the enhancement content asset from the media store of the wireless carrier network or the third-party content provider via the reference and then discarding the enhancement content asset to prevent the enhancement content asset from being presented for a presentation of the incoming communication alert on the user interface, and presenting the incoming communication alert on the user interface.

15. The user device of claim 14, wherein the reference is a specific media asset link for the enhancement content asset stored in a media store of the wireless carrier network or a media server of the third-party content provider, a directory location link to a directory location on the media store of the wireless carrier network or the media server of the third-party content provider, or a server pointer to a server of the wireless carrier network or the third-party content provider that is responsible for generating and providing the enhancement content asset.

16. The user device of claim 14, wherein the acts further comprise:
   receiving an input via a user configuration interface displayed on the user device, the input indicating that enhancement content assets as initiated by a caller, or a group of callers that includes the caller, are to be suppressed from presentation on the user interface of the user device; and
   storing a corresponding configuration rule in the configuration data store that prevents the enhancement content assets initiated by the caller or the group of callers from being presented or retrieved via associated references of the enhancement content assets for presentation.

17. The user device of claim 14, wherein the acts comprise:
   receiving an input via a user configuration interface displayed on the user device, the input indicating suppression of enhancement content assets of a particular asset format or asset category; and
   storing a corresponding configuration rule in the configuration data store that prevents the enhancement content assets of the particular asset format or asset category from being presented or retrieved via associated references of the enhancement content assets for presentation.

18. The user device of claim 14, wherein the communication includes a voice call, a video call, an email message, a text message, or a chat message, and wherein the enhancement content asset includes an additional text message, a social media feed, a rich media file, audio content, still image content, video content, multimedia content, web page scripts, a uniform resource locator (URL), or a link to at least one of content or an application.

19. The user device of claim 14, wherein the communication is routed through a serving GPRS support node (SGSN) or a Proxy Call Session Control Function (P-CSCF) of the wireless carrier network.

20. A computer-implemented method, comprising:
   storing a configuration rule in a configuration data store of a user device that prevents presentations of enhancement content assets that include content provided by third-party providers for callers for presentations of incoming communication alerts on a user interface of the user device while allowing presentation of other enhancement content assets that include content generated by the callers along with the presentations of incoming communication alerts on the user interface;
   receiving an incoming communication alert at a user device for a communication that is initiated on a caller user device by a caller and routed to the user device via a wireless carrier network;
   receiving an enhancement content asset that includes content provided by a third-party provider for the caller at the user device for presentation along with the incoming communication alert and an emergency override command;
   in response to the emergency override command, overriding the configuration rule in the configuration data store of the user device that prevents presentation of the enhancement content asset that includes the content provided by the third-party for the caller; and
   presenting the enhancement content asset that includes the content provided by the third-party for the caller along with the presentation of the incoming communication alert on the user interface following an override of the configuration rule.

* * * * *